United States Patent
Aweya

(10) Patent No.: US 11,018,789 B2
(45) Date of Patent: May 25, 2021

(54) END-TO-END TRANSPARENT CLOCKS AND METHODS OF ESTIMATING SKEW IN END-TO-END TRANSPARENT CLOCKS

(71) Applicants: Khalifa University of Science and Technology, Abu Dhabi (AE); British Telecommunications plc, London (GB); Emirates Telecommunications Corporation, Abu Dhabi (AE)

(72) Inventor: James Aweya, Abu Dhabi (AE)

(73) Assignees: Khalifa University of Science and Technology, Abu Dhabi (AE); British Telecommunications plc, London (GB); Emirates Telecommunications Corporation, Abu Dhabi (AE)

(*) Notice: Subject to any disclaimer, the term of this patent is extended or adjusted under 35 U.S.C. 154(b) by 169 days.

(21) Appl. No.: 16/036,178

(22) Filed: Jul. 16, 2018

(65) Prior Publication Data
US 2020/0021378 A1    Jan. 16, 2020

(51) Int. Cl.
*H04J 3/06*    (2006.01)

(52) U.S. Cl.
CPC .......... *H04J 3/0644* (2013.01); *H04J 3/0661* (2013.01)

(58) Field of Classification Search
CPC .............................. H04J 3/0644; H04J 3/0661
See application file for complete search history.

(56) References Cited

U.S. PATENT DOCUMENTS

| 8,873,589 | B2* | 10/2014 | Aweya | H04J 3/0667 370/503 |
| 8,959,381 | B2* | 2/2015 | Aweya | G06F 1/04 709/203 |
| 9,665,121 | B2* | 5/2017 | Aweya | G06F 1/12 |
| 9,671,822 | B2* | 6/2017 | Aweya | H04J 3/0667 |
| 2004/0057379 | A1* | 3/2004 | Chen | H04L 43/106 370/235 |
| 2009/0310625 | A1* | 12/2009 | Roberts | H04J 3/0661 370/498 |

(Continued)

FOREIGN PATENT DOCUMENTS

WO    2016092243 A1    6/2016

OTHER PUBLICATIONS

Zongpeng Du, et al. "An Enhanced End-to-End Transparent Clock Mechanism with a Fixed Delay Ratio" IEEE Communications Letters, vol. 15, No. 8, pp. 872-874 Aug. (2011).

(Continued)

*Primary Examiner* — Lance Leonard Barry
*Assistant Examiner* — Timothy Sowa
(74) *Attorney, Agent, or Firm* — Calfee, Halter & Griswold LLP

(57) ABSTRACT

This invention relates to end-to-end transparent clocks and methods of estimating skew in end-to-end transparent clocks. Embodiments of the invention relate to techniques for estimating clock skew between a free-running clock in a transparent clock and a master clock, in particular by using the timing information embedded in timing messages passing through the transparent clock. Further embodiments of the invention set out uses of these estimates to modify the residence times computed by the transparent clock and a synchronization network including such transparent clocks.

21 Claims, 4 Drawing Sheets

(56) References Cited

U.S. PATENT DOCUMENTS

| | | | | |
|---|---|---|---|---|
| 2011/0051754 A1* | 3/2011 | Lansdowne | ........... | H04J 3/0697 370/503 |
| 2012/0072761 A1* | 3/2012 | Guo | ........... | H04J 3/0673 713/600 |
| 2012/0307845 A1* | 12/2012 | Le Pallec | ........... | H04J 3/0673 370/503 |
| 2013/0039359 A1* | 2/2013 | Bedrosian | ........... | H04J 3/0667 370/350 |
| 2013/0080817 A1* | 3/2013 | Mihelic | ........... | G06F 1/10 713/401 |
| 2013/0100832 A1* | 4/2013 | Flinn | ........... | H04L 43/0852 370/252 |
| 2013/0182806 A1* | 7/2013 | Obradovic | ........... | H04L 7/04 375/356 |
| 2014/0010244 A1* | 1/2014 | Bui | ........... | H04J 3/0667 370/503 |
| 2014/0192826 A1* | 7/2014 | Zampetti | ........... | H04J 3/0644 370/503 |
| 2015/0092793 A1* | 4/2015 | Aweya | ........... | H04J 3/0685 370/503 |
| 2015/0093109 A1* | 4/2015 | Joergensen | ........... | H04J 14/02 398/45 |
| 2015/0163000 A1* | 6/2015 | Aweya | ........... | H04L 7/033 370/519 |
| 2016/0170439 A1* | 6/2016 | Aweya | ........... | G06F 1/10 713/401 |
| 2016/0170440 A1* | 6/2016 | Aweya | ........... | H04L 69/28 713/503 |

OTHER PUBLICATIONS

International Search Report dated Mar. 27, 2019 on PCT/EP2018/069299.

David Rosselot, "IEEE 1588 Boundary Clock and Transparent Clock Implementaiton Using the DP83640", 2008 National Semiconductor Application Note 1838, (1-6) Apr. 28, 2008.

Kalman, R.E. A New Approach to Linear Filtering and Prediction Problems, Transactions of the ASME—Journal of Basic Engineering, 82 (Series D): 35-45. Copyright © (1960) by ASME.

* cited by examiner

END-TO-END TRANSPARENT CLOCKS AND METHODS OF ESTIMATING SKEW IN END-TO-END TRANSPARENT CLOCKS

FIELD OF THE INVENTION

The present invention relates to end-to-end transparent clocks and methods of estimating skew in end-to-end transparent clocks. It is particularly, but not exclusively, concerned with techniques for estimating clock skew between a free-running clock in a transparent clock and a master clock.

BACKGROUND OF THE INVENTION

IEEE1588 PTP is a time and frequency transfer protocol wherein a GrandMaster clock is synchronized to a high-quality source such as GPS and then generates packets with precise timestamps that are sent downstream to slave devices. A slave device uses these timestamps (which can be obtained through various PTP message exchange mechanisms) to derive, locally, an accurate estimate of the GM clock. The recovered GM clock at the slave is in turn supplied to equipment requiring synchronization.

The devices between the GM and slave clocks may be ordinary switches and routers, or specialized equipment with on-path support, such as Transparent Clocks (TCs), that are intended to mitigate the effects of timing impairments introduced by the network between the GM and slave. TCs have been introduced in IEEE 1588 Version 2 to allow for the measurement of the actual delays experienced by PTP packets and to communicate these delay measurements to slaves. A slave can then correctly adjust its clock while compensating for the actual delay variations. This is to allow the slaves to remove the negative effects that these delay variations cause in clock synchronization. This variation in delay and any asymmetry affects the quality of synchronization of the slave device.

For most accurate residence time measurements, the PTP clocks in each TC should be syntonized with the Grand-Master. Accurate residence time measurements determine how accurate the clock synchronization at the slave would be. However, the clock skews (or frequency differences) between the clocks at the TCs on the path and the Grand-Master can render the residence time measurements inaccurate. To obtain more accurate measurements at the TCs, the clock skews have to be accurately estimated and removed from (or compensated for) in the measurements.

One way to do so is to physically tune the TC clocks to be syntonized to the GrandMaster clock. The accurately syntonized TC clocks can then be used for residence time measurements. Alternatively, syntonization may be handled on the TC processor (in software) without physically adjusting the rate of the TC clocks, that is, the TCs use free-running clocks. The computed clock skew (between the free-running TC clock and GrandMaster) may be used by the TC to modify the measured residence times inserted into Sync/Follow_Up and Delay_Resp messages.

There are currently two main methods used to syntonize the TC clocks. One is using Synchronous Ethernet (SyncE) (defined in ITU-T Recommendations G.8261, G.8262, and G.8264) which is a timing transfer method that passes timing over the Physical Layer of Ethernet using SONET/SDH-like timing techniques. The main limitation of this method is that it cannot be applied over networks (even Ethernet) which have already been deployed without such timing transfer capabilities. An implementation will require an all SyncE network on the path linking the GrandMaster and the TC. In such an implementation, the timing signal carried by SyncE is used to frequency lock the TC oscillator to the Grand-Master The other method is generating syntonization signals from timestamps captured from Sync messages (only) sent from the GrandMaster to the slave device. The syntonization signal can be used to physically tune the TC oscillator or modify the measured residence times. The example methods described in the IEEE 1588 Version 2 Standard for generating the syntonization signals are very simplistic (using Sync messages only and simple linear estimation techniques) such that they do not provide accurate syntonization.

Overview of IEEE 1588v2 PTP

The GrandMaster (GM) is the root timing reference in a domain and transmits synchronization information to the clocks residing in its domain. In IEEE 1588v2 PTP messages are categorized into event and general messages. All IEEE 1588 PTP messages have a common header. Event messages are timed messages in that an accurate timestamp is generated at both transmission and receipt of each message. Event messages have to be accurately timestamped since the accuracy in transmission and receipt timestamps directly affects clock distribution accuracy.

A timestamp event is generated at the time of transmission and reception of any event message. General messages are not required to be timestamped. The set of event messages consists of Sync, Delay_Req, Pdelay_Req, and Pdelay_Resp. The set of general messages consists of Announce, Follow_Up, Delay_Resp, Pdelay_Resp_Follow_Up, Management, and Signaling.

IEEE 1588 PTP allows for two different types of time-stamping methods, either one-step or two-step. One-step clocks update time information within event messages (Sync and Delay-Req) on-the-fly, while two-step clocks convey the precise timestamps of packets in general messages (Follow_Up and Delay-Resp).

The Sync, Delay_Req, Follow_Up, and Delay_Resp messages are used to generate and communicate the timing information needed to synchronize ordinary and boundary clocks (see description below) using the delay request-response mechanism. A Sync message is transmitted by a GM to its slaves and either contains the exact time of its transmission or is followed by a Follow_Up message containing this time. In a two-step ordinary or boundary clock, the Follow_Up message communicates the value of the departure timestamp for a particular Sync message. A Delay_Req message is a request for the receiving node to return the time at which the Delay_Req message was received, using a Delay_Resp message.

The basic pattern of synchronization message exchanges for the one-step and two-step clocks are illustrated in FIG. 1. The message exchange pattern for the two-step clock can be explained as follows. The GM 1 sends a Sync message to the slave 3 over a packet network 2 and notes the time $T_1$ at which it was sent according to the GM clock 4. The slave 3 receives the Sync message and notes the time of reception $T_2$ according to the slave clock 5. The GM 1 conveys to the slave the timestamp $T_1$ by one of two ways: 1) Embedding the timestamp $T_1$ in the Sync message (one-step clock). This requires some sort of hardware processing (i.e., hardware timestamping) for highest accuracy and precision. 2) Embedding the timestamp $T_1$ in a Follow_Up message (two-step clock). Next, the slave 3 sends a Delay_Req message to the GM 1 and notes the time $T_3$ at which it was sent according to the slave clock 5. The GM 1 receives the Delay_Req message and notes the time of reception $T_4$ according to the GM clock 4. The GM 1 conveys to the slave the timestamp $T_4$ by embedding it in a Delay_Resp message.

At the end of this PTP messages exchange, the slave 3 possesses all four timestamps $\{T_1, T_2, T_3, T_4\}$. These timestamps may be used to compute the offset of the slave clock 5 with respect to the GM clock 4 and the mean propagation time of messages between the two clocks. The computation of offset and propagation time often assumes that the GM-to-slave and slave-to-GM propagation times are equal—i.e. a symmetrical communication path.

Transparent Clocks

A TC acts invisibly to the GM and slave from a synchronization perspective by providing a timestamp correction term to PTP event messages traversing the TC. There are two forms of transparent clocks. The end-to-end (E2E) TC provides a correction that reflects the residence time (or dwell-time) of the packet within the equipment itself. A peer-to-peer (P2P) TC includes in the correction its own internal delay as well as an estimate of the link delay between itself and its upstream device.

TCs are PTP devices that operate as normal switches, but they update the correction field (correctionField) of the PTP packets with a value equal to their residence time, that is, the time the packet was delayed in the switch (E2E TCs), or the residence time plus the peer link delay (P2P TCs). The purpose of the TC function providing on-path support is to remove the effect of PDV by informing downstream devices of precisely what these delays were on a packet-by-packet basis.

End-to-End (E2E) Transparent Clock

An E2E Transparent Clock is a multi-port device that is not a master or slave clock but a bridge between the two. This clock measures the message transit time (also known as resident time) in the device for (PTP event) Sync and Delay_Req messages. The use of E2E TCs 6 is shown schematically in FIG. 2. This measured transit time is added to the correction field in the corresponding messages:

The measured transit time of a Sync message is added to the correction field of the corresponding Sync or the Follow_Up message. In the one-step mode the residence time is added to the correction field of the Sync message; in the two-step mode the residence time is added to the correction field of the Follow_Up message.

The measured transit time of a Delay_Req message is added to the correction field of the corresponding Delay_Resp message.

E2E TC devices 6 measure the delay caused by the PTP packet residing in the TC device and increment the correction field in the PTP header as shown in FIG. 3. FIG. 4 shows the flow of PTP messages through an example network of E2E TC devices. The correction field ends up containing the sum of all the residence times that a Sync or Delay_Req message has encountered on its way through all E2E-TC network elements on the path.

By doing so, the slave clock or boundary clock further down the line can determine how long the PTP packet resided in the TC devices before it. The slave clock can then use the residence times accumulated in the correction field to mitigate the effects of PDV. This information is used by the slave when determining the clock offset and skew between the slave's and the master's time. E2E transparent clocks do not provide correction for the propagation delay of the link itself between devices; only P2P TCs support this.

A one-step E2E TC updates for switch delay in Sync and Delay-Req messages as they pass through the switch while a two-step TC updates a field in the non time-critical general message (Follow_Up and Delay_Resp).

The process in FIG. 4 continues hop by hop (where N is the number of hops or links), and the Follow-Up (two-step mode), Sync (one-step mode) or Delay_Req (delay request-response mechanism) messages maintain a running total of the residence times; resulting in a grand total delay value from GM to slave. Upon receipt of the final message, the slave device calculates its offset using the total residence time which is accumulated in the correction field as follows:

$$\text{total\_residence\_time} = \sum_{i=1}^{N-1} r_i$$

As shown in FIG. 5, the transparent clock devices 6 on the communication path to each slave 3 measure the delay caused by the PTP packet residing in the TC device and increments the correction field in the PTP header. By doing so, the slave clock 5 or boundary clock further down the line can determine how long the PTP packet resided in the TC devices before it. The slave 3 can then use the values in the correction field to compensate for the effects PDV on its path when synchronizing it clock to the GM clock 4.

Merits of Using Syntonized or Skew Compensated Transparent Clocks

Syntonizing or compensating for the skew can help in improving residence time measurement accuracy. As explained above, accurate residence time measurements enable accurate synchronization at the slave. Consider the case where a TC clock is not syntonized or contains a free-running oscillator with frequency accuracy (or skew) $\alpha_{free}$ no worse than ±100 ppm. If residence time is measured using this oscillator, there will be an error on the order of the residence time multiplied by the actual frequency offset $\alpha_{free}$.

Let $r_{ideal}$ be the ideal residence time (when the TC is accurately syntonized to the GM) and $r_{act}$ be the actual measured residence time when the TC is not accurately syntonized or the TC is using a free-running oscillator and has skew of $\alpha_{free}$. This gives:

$$r_{act} = (1+\alpha_{free})r_{ideal} = r_{ideal} + \alpha_{free}r_{ideal} + r_{ideal} + r_{error}, \quad (1)$$

In the above equation, $r_{error}$ is the (positive or negative) error in the residence time measurement when the skew is non-zero and is $\alpha_{free}$.

Optimum synchronization performance is obtained when all TCs on a synchronization path are frequency locked (syntonized) to the GM clock. If a TC is not frequency synchronized to the GM, a TC with a ±100 ppm accuracy will contribute a measurement error of ±(0.0001×10 ms)=±1 μs (or ±1000 ns) to the residence time if the ideal residence time is 10 ms. However, a positive effect is that oscillators do not typically operate at the extreme ends of their accuracy limits.

To reduce this error, IEEE 1588 Version 2 allows the TC to be syntonized, i.e., synchronized in frequency, to the GM. Each TC will use its own internal mechanisms to measure frequency offset relative to the GM and to synthesize a frequency signal that is syntonized with the GM. This synthesis may be done via hardware, firmware, or software.

Assume a network with nodes having standard Ethernet oscillators, with nominal frequencies of 25 MHz for 100 Mbit/s Ethernet and 125 MHz for 1 Gbit/s Ethernet. This means that the phase measurement granularity in the TC and ordinary clock can be as much as 40 ns for 100 Mbits/s Ethernet. Additional phase error will result from the variable component of latency in the Ethernet physical layer (PHY) (the fixed component can be specified by the manufacturer in the design).

Considering the case of a syntonized TC local oscillator, if the frequency offset between the GM and TC oscillator is measured and a syntonized frequency is created, the use of this frequency for the TC delay computation will greatly reduce the magnitude of the TC measurement errors. The phase step magnitude will now be on the order of the syntonized frequency measurement accuracy multiplied by the synch interval.

For example, if the phase measurement granularity is 40 ns (assuming a 25 MHz oscillator for 100 Mbit/s Ethernet) and the TC oscillator frequency offset is measured/syntonized over 100 ms (to be at this phase granularity or, in other words, frequency), then the measured frequency offset or skew is $40 \times 10^{-9}$ s/0.1 s=$400 \times 10^{-9}$=0.4 ppm (parts-per-million). The TC measurement error or offset now is $(400 \times 10^{-9})(0.01$ s$)$=4 ns, i.e., the TC measurement error is reduced from the 1000 ns computed when an unsyntonized clock or free-running local oscillator is used for the measurement by a factor of 250.

In practice, the reduction will not be this large because other effects are present, e.g., oscillator phase noise and drifts due to temperature effects, phase measurement error due to the variable portion of the PHY latency, and frequency measurement granularity.

For most accurate residence time measurements, the clocks in each TC should be syntonized with the GM. Syntonization only requires correction to the TC oscillator frequency. The TC host processor can use the ingress timestamps from Sync messages to determine a frequency (rate) correction required for the TC clock. Alternatively, syntonization may be handled on the TC host processor without adjusting the frequency of the TC clocks. The frequency correction may be used to modify the computed residence times inserted into Follow_Up and Delay_Resp messages.

An object of the present invention is to provide techniques that allow an E2E TC with free-running local clock to use timing message timestamps intercepted by the TC for accurate clock skew estimation.

A further object of the present invention is to improve the accuracy of the residence times computed by an E2E TC.

SUMMARY OF THE INVENTION

An exemplary embodiment of the invention provides a method of estimating the skew of a local clock in an end-to-end transparent clock device connected in a network between a master device having a master clock and a slave device, the method including the steps of: exchanging timing messages between the master device and the slave device over the network, the timing messages passing through said transparent clock device; recording times of sending and receiving of said timing messages by the master device; extracting, in the transparent clock device, from timing messages sent from the master device to the slave device, the times of sending and receiving of said timing messages; recording the times of receipt by the transparent clock device of timing messages sent from the master device to the slave device; recording the times of sending by the transparent clock device of timing messages sent from the slave device to the master device; extracting, in the transparent clock device, from the timing messages, the residence time of the timing messages in other transparent clock devices between the master device and the transparent clock device; and estimating the skew of the local clock compared to the master clock using a plurality of each of said extracted and recorded times.

A further exemplary embodiment of the invention provides an end-to-end transparent clock device for use in a network between a master device having a master clock and a slave device, the transparent clock device having: a local clock; and a processor, wherein the transparent clock device is arranged to: receive and re-transmit timing messages sent in both directions between the master device and the slave device over the network, and the processor is arranged to: extract, from timing messages sent from the master device to the slave device, the times of sending and receiving of said timing messages; record the times of receipt by the transparent clock device of timing messages sent from the master device to the slave device; record the times of re-transmission by the transparent clock device of timing messages sent from the slave device to the master device; extract, from the timing messages, the residence time of the timing messages in other transparent clock devices between the master device and the transparent clock device; and estimate the skew of the local clock compared to the master clock using a plurality of each of said extracted and recorded times.

A further exemplary embodiment of the invention provides a networked time system including a master device having a master clock and a slave device, a network connecting the master device to the slave device and an end-to-end transparent clock device located in the network between the master device and the slave device and having a local clock, wherein: the master device and slave device are arranged to exchange timing messages over the network, the timing messages passing through said transparent clock device; the master device is arranged to record times of sending and receiving of said timing messages at the master device; the transparent clock device includes a local clock and a processor, and the processor is arranged to: extract, from timing messages sent from the master device to the slave device, the times of sending and receiving of said timing messages; record the times of receipt by the transparent clock device of timing messages sent from the master device to the slave device; record the times of sending by the transparent clock device of timing messages sent from the slave device to the master device; extract, from the timing messages, the residence time of the timing messages in other transparent clock devices between the master device and the transparent clock device; and estimate the skew of the local clock compared to the master clock using a plurality of each of said extracted and recorded times.

BRIEF DESCRIPTION OF THE DRAWINGS

Embodiments of the invention will now be described by way of example with reference to the accompanying drawings in which.

DETAILED DESCRIPTION

Figure 1:
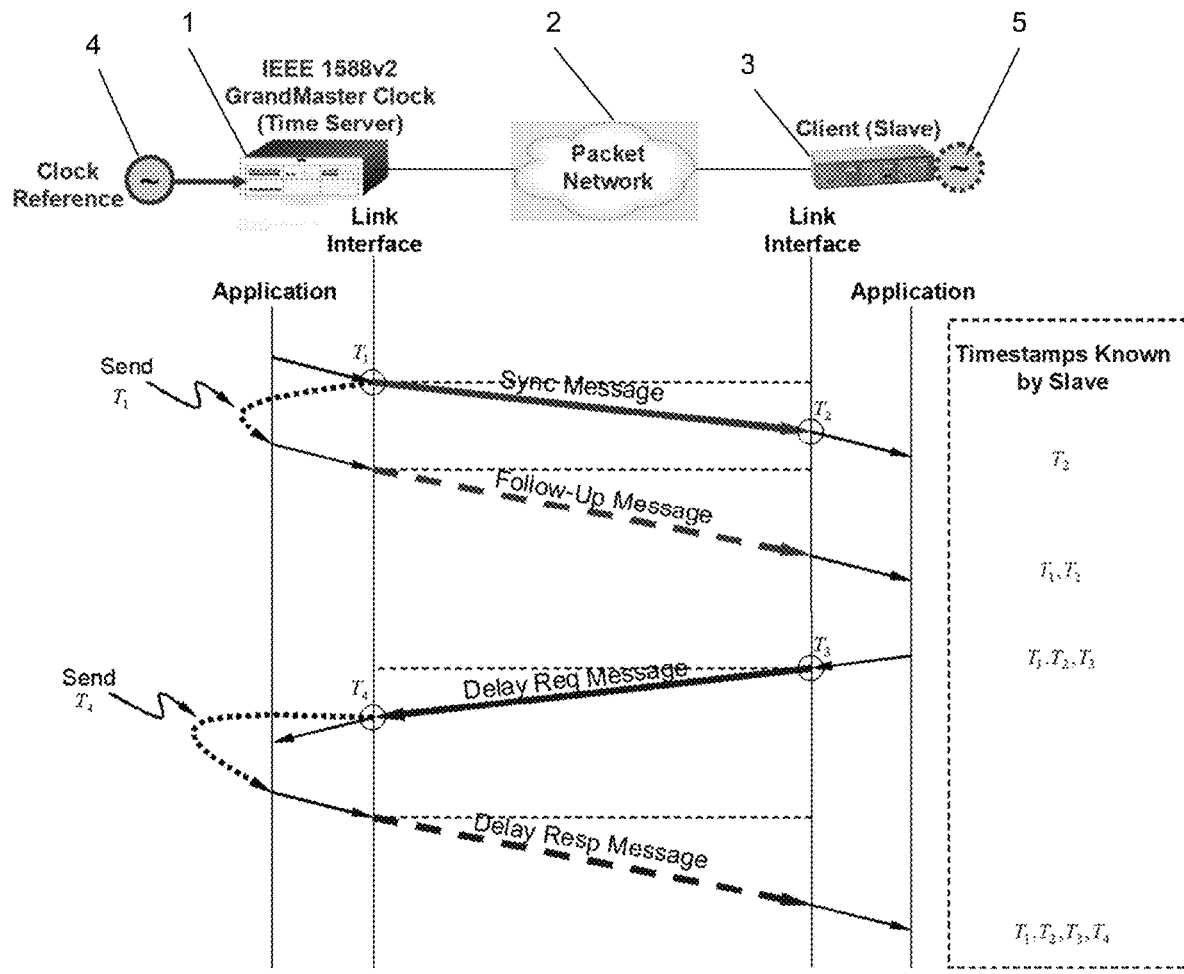
FIG. 1 shows the message flow according to the two-step clock of IEEE 1588 PTP and has already been described.
Figure 2:
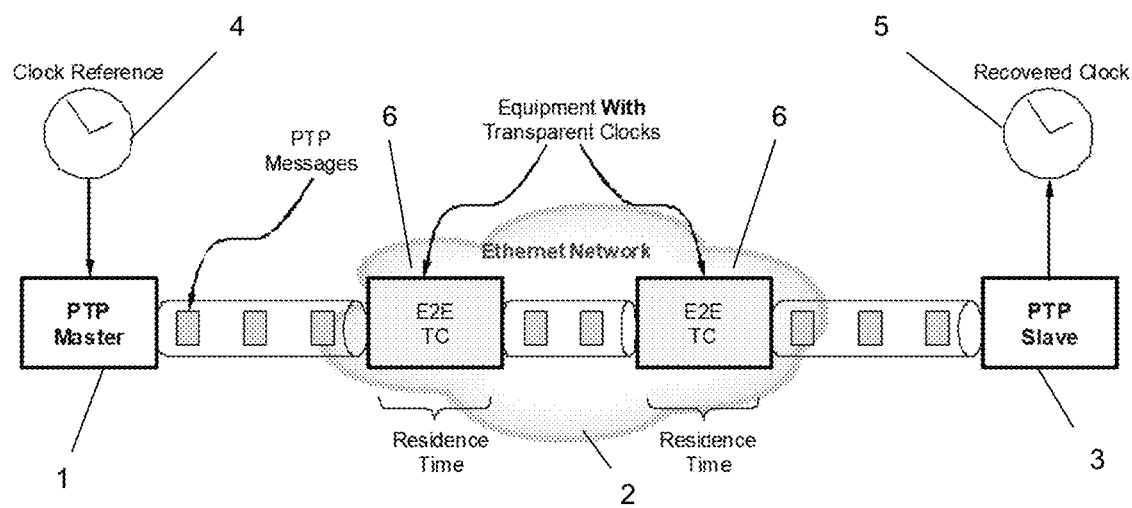
FIG. 2 shows the principles of clock transfer using end-to-end (E2E) transparent clocks and has already been described.
Figure 3:
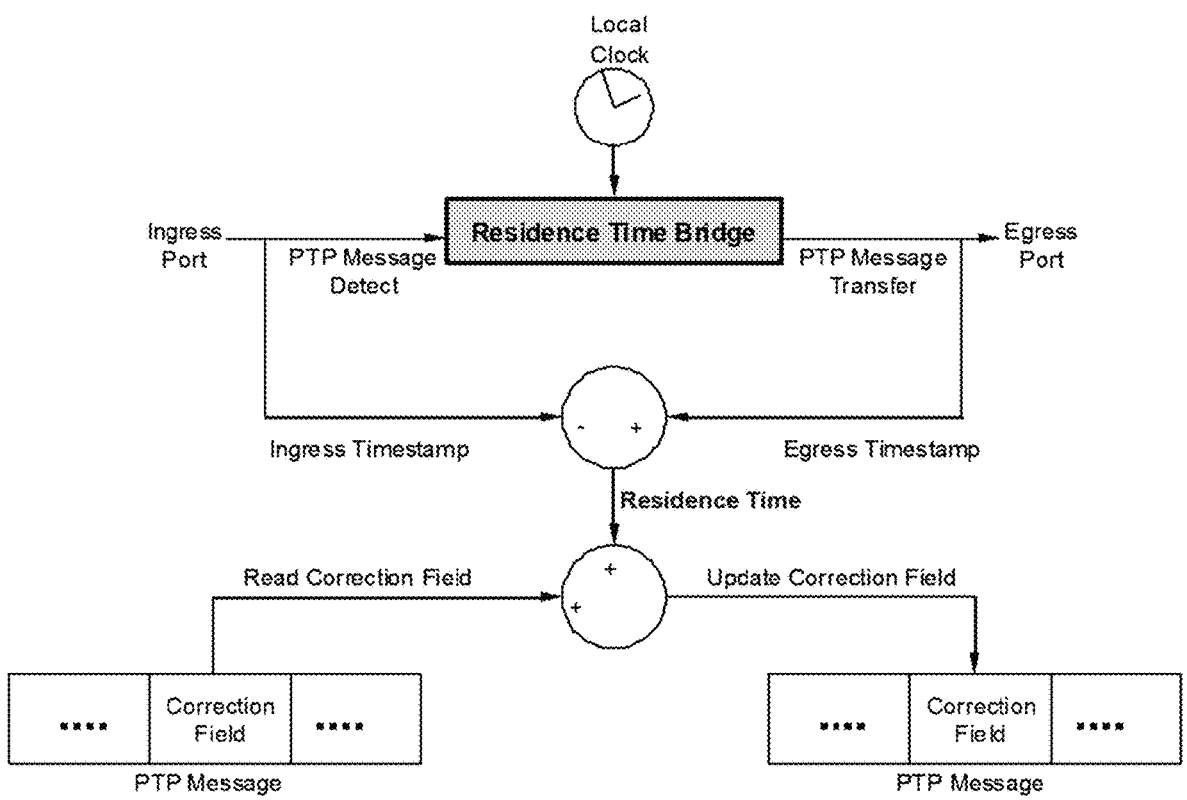
FIG. 3 shows the application of corrections in E2E transparent clocks and has already been described.
Figure 4:
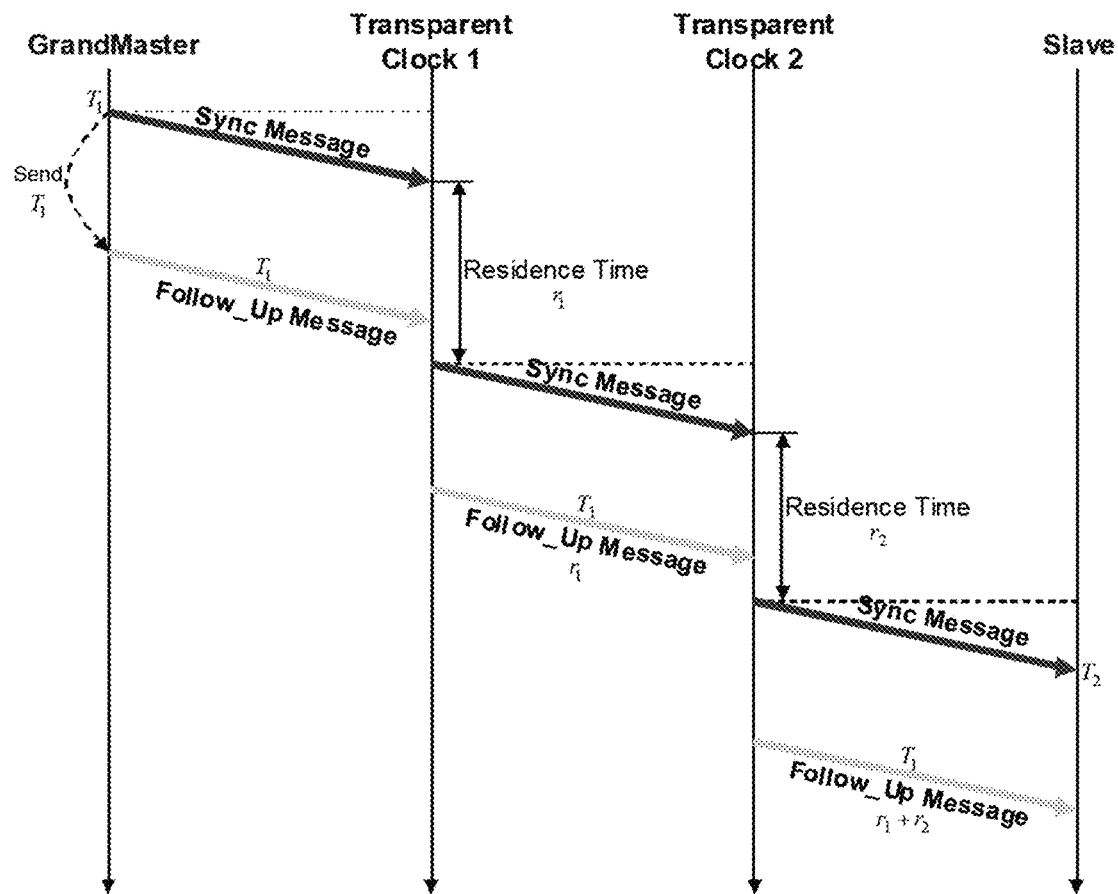
FIG. 4 shows the message flow through E2E transparent clocks and has already been described.

At their broadest, aspects of the present invention provide for methods and systems for estimating the skew of a local clock in an end-to-end transparent clock device using information from timing messages passing between a master and slave device through that transparent clock device.

A first aspect of the present invention provides a method of estimating the skew of a local clock in an end-to-end transparent clock device connected in a network between a master device having a master clock and a slave device, the method including the steps of:

exchanging timing messages between the master device and the slave device over the network, the timing messages passing through said transparent clock device; recording times of sending and receiving of said timing messages by the master device; extracting, in the transparent clock device, from timing messages sent from the master device to the slave device, the times of sending and receiving of said timing messages; recording the times of receipt by the transparent clock device of timing messages sent from the master device to the slave device; recording the times of sending by the transparent clock device of timing messages sent from the slave device to the master device; extracting, in the transparent clock device, from the timing messages, the residence time of the timing messages in other transparent clock devices between the master device and the transparent clock device; and estimating the skew of the local clock compared to the master clock using a plurality of each of said extracted and recorded times.

In this way the skew of the local clock can be accurately estimated using the existing pattern of timing messages exchanged between the master and slave devices and without the need for physical synchronization or use of separate timing messages.

Further, by taking account of the message flows in both the forward (master to slave) and reverse (slave to master) direction, a more accurate estimation of the skew of the local clock may be obtained.

Preferably the timing messages are messages under the IEEE 1588 PTP.

Preferably the method further includes the step of syntonizing the local clock to the master clock. By syntonizing (synchronizing the frequency) the local clock to the master clock, the timing information provided by the transparent clock can be made more accurate, but without the need for physical syntonization. The syntonization can be achieved by post-processing the output of a free-running local clock.

Preferably the method further includes the step of computing modified residence times in the transparent clock device using the estimated skew of the local clock. By computing more accurate residence times in the transparent clock device, the accuracy of the synchronization of a clock in the slave device to the master clock can be improved as more accurate information regarding the delays in the network between the master and the salve device can be provided. Ideally, all transparent clocks between the master and the slave would compute modified residence times in this manner, but improvements will result even if only one of the transparent clocks operates in this manner.

Preferably the step of computing modified residence times uses a filtered value of the skew, for example using an exponentially weighted moving average filter.

In certain embodiments the master device and transparent clock device are capable of hardware timestamping arriving and outgoing timing messages, and the step of extracting the residence time includes: extracting the residence time recorded in the timing messages sent from the master device to the slave device on arrival in the transparent clock device; and extracting the residence time recorded in the timing messages sent from the slave device to the master device on departure from the transparent clock device and the total residence time recorded between the slave device and the master device.

In such "one-step clock" arrangements, the residence time in transparent clocks between the master device and the transparent clock device itself in the forward direction between the master and the slave can be determined from the residence time recorded in a timing message when it arrives at the transparent clock. The residence time in the same transparent clocks in the reverse direction (slave to master) is the difference between the residence time for all transparent clocks between the slave and the message leaving the transparent clock device itself and the total residence time for the entire journey from slave to master.

In certain embodiments the master device and transparent clock device are not capable of hardware timestamping the arriving and outgoing timing messages, the method further including the steps of: for each first timing message (e.g. an IEEE 1588 PTP "Sync" message) sent from the master device to the slave device, sending a first further timing message (e.g. an IEEE 1588 PTP "Follow_Up" message) from the master device to the slave device which contains the time of sending of the respective first timing message by the master device, and to which is cumulatively added, by each transparent clock that the further timing message passes through, a first residence time being the time taken for the respective first timing message to pass through each said transparent clock device; and for each second timing message sent from the slave device to the master device (e.g. an IEEE 1588 PTP "Delay_Req" message), sending a second further timing message (e.g. an IEEE 1588 PTP "Delay_Resp" message) from the master device to the slave device which contains the time of receipt of the respective second timing message by the master device, and to which is cumulatively added, by each transparent clock that the second further timing message passes through, a second residence time being the time taken for the respective second timing message to pass through each said transparent clock device, and wherein the step of extracting the residence time includes: extracting the first residence time recorded in one of said first further timing messages; and extracting the second residence time recorded in one of said second further timing messages on receipt of the second further timing message at the transparent clock device.

In such "two-step clock" arrangements, the residence time in transparent clocks between the master device and the transparent clock device itself in the forward direction between the master and the slave can be determined from the residence time recorded in the first further timing message (e,g. "Follow_Up" message) when it arrives at the transparent clock. The residence time in the same transparent clocks in the reverse direction (slave to master) is recorded by the transparent clocks as the message (e.g. "Delay_Req" message) passes through those transparent clocks, but is added to the second further timing message (e.g. "Delay_Resp" message) when it is returned to the slave.

In certain embodiments, the step of estimating the skew of the local clock is a linear approximation. For example the step of estimating may include: calculating a component $\alpha_1$ of the skew in the forward direction from master device to slave device as:

$$\alpha_1 = \frac{(T_{1,n} - T_{1,n-1}) + (r_{ftotal,n} - r_{ftotal,n-1})}{(T_{2TC,n} - T_{2TC,n-1})} - 1$$

wherein $T_{1,n}$ is the departure time of the nth timing message sent from the master device to the slave device, $T_{2TC,n}$ is the arrival time of the nth timing message sent from the master device to the slave device at the transparent clock device and $r_{ftotal,n}$ is the cumulative residence time of the nth timing message sent from the master device to the slave device in other transparent clock devices whilst travelling between the master device and the transparent clock device, calculating a component $\alpha_2$ of the skew in the reverse direction from slave device to master device as:

$$\alpha_2 = \frac{(T_{4,n} - T_{4,n-1}) + (r_{rtotal,n} - r_{rtotal,n-1})}{(T_{3TC,n} - T_{3TC,n-1})} - 1$$

wherein $T_{4,n}$ is the arrival time of the nth timing message sent from the slave device to the master device, $T_{3TC,n}$ is the departure time of the nth timing message sent from the slave device to the master device from the transparent clock device and $r_{rtotal,n}$ is the cumulative residence time of the nth timing message sent from the slave device to the master device in other transparent clock devices whilst travelling between the transparent clock device and the master device, and estimating the skew as the average of $\alpha_1$ and $\alpha_2$.

In certain embodiments the step of estimating the skew of the local clock includes operating a Kalman filter. For example a Kalman filter may be operated using the measurement equation $$\underbrace{(T_{1,n} - T_{2TC,n}) + (T_{4,n} - T_{3TC,n}) + (d_f - d_r) + (r_{ftotal,n} - r_{rtotal,n})}_{y_n} =$$

$$\underbrace{2\theta_n}_{D_n X_n} + \underbrace{(\gamma_n - \varepsilon_n)}_{v_n}$$

wherein $\theta_n$ and $\alpha_n$ are the total offset and skew during the nth exchange of timing messages, $T_{1,n}$ is the departure time of the nth timing message sent from the master device to the slave device, $T_{2TC,n}$ is the arrival time of the nth timing message sent from the master device to the slave device at the transparent clock device $T_{4,n}$ is the arrival time of the nth timing message sent from the slave device to the master device, $T_{3TC,n}$ is the departure time of the nth timing message sent from the slave device to the master device from the transparent clock device, $r_{ftotal,n}$ is the cumulative residence time of the nth timing message sent from the master device to the slave device in other transparent clock devices whilst travelling between the master device and the transparent clock device, $r_{rtotal,n}$ is the cumulative residence time of the nth timing message sent from the slave device to the master device in other transparent clock devices whilst travelling between the transparent clock device and the master device, $d_f$ and $d_r$ are the fixed delays in the directions from master device to slave device and slave device to master devices respectively, $y_n = (T_{1,n} - T_{2TC,n}) + (T_{4,n} - T_{3TC,n}) + (d_f - d_r) + (r_{ftotal,n} - r_{rtotal,n})$ is a scalar, n is a nonnegative time index, $D_n = [2\ 0]$ is a 1×2 matrix, $X_n^T = [\theta_n\ \alpha_n]$ is a vector, and $v_n = (\gamma_n\ \varepsilon_n)$ is the measurement noise, and using the state equation:

$$X_n = \begin{bmatrix} \theta_n \\ \alpha_n \end{bmatrix} = \begin{bmatrix} 1 & (T_{2TC,n} - T_{2TC,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = A_n X_{n-1} + w_n$$

where $w_n^T = [w_{\theta,n} w_{\alpha,n}]$ is a process noise vector.

Embodiments using a Kalman filter such as that above can also estimate the offset of the local clock compared to the master clock.

The method of the present aspect may include any combination of some, all or none of the above described preferred and optional features.

The method of the above aspect is preferably implemented by a transparent clock device according to the second aspect of this invention, or a networked time system according to the third aspect of this invention, as described below, but need not be.

Further aspects of the present invention include computer programs for running on computer systems which carry out the method of the above aspect, including some, all or none of the preferred and optional features of that aspect.

A second aspect of the present invention provides an end-to-end transparent clock device for use in a network between a master device having a master clock and a slave device, the transparent clock device having: a local clock; and a processor, wherein the transparent clock device is arranged to: receive and re-transmit timing messages sent in both directions between the master device and the slave device over the network, and the processor is arranged to: extract, from timing messages sent from the master device to the slave device, the times of sending and receiving of said timing messages; record the times of receipt by the transparent clock device of timing messages sent from the master device to the slave device; record the times of re-transmission by the transparent clock device of timing messages sent from the slave device to the master device; extract, from the timing messages, the residence time of the timing messages in other transparent clock devices between the master device and the transparent clock device; and estimate the skew of the local clock compared to the master clock using a plurality of each of said extracted and recorded times.

In this way the skew of the local clock can be accurately estimated using the existing pattern of timing messages exchanged between the master and slave devices and without the need for physical synchronization or use of separate timing messages.

Further, by taking account of the message flows in both the forward (master to slave) and reverse (slave to master) direction, a more accurate estimation of the skew of the local clock may be obtained.

Preferably the timing messages are messages under the IEEE 1588 PTP.

Preferably the processor is further arranged to syntonize the local clock to the master clock.

By syntonizing (synchronizing the frequency) the local clock to the master clock, the timing information provided by the transparent clock can be made more accurate, but without the need for physical syntonization. The syntonization can be achieved by post-processing the output of a free-running local clock.

Preferably the processor is further arranged to compute modified residence times in the transparent clock device using the estimated skew of the local clock. By computing more accurate residence times in the transparent clock device, the accuracy of the synchronization of a clock in the slave device to the master clock can be improved as more accurate information regarding the delays in the network between the master and the salve device can be provided. Ideally, all transparent clocks between the master and the slave would compute modified residence times in this manner, but improvements will result even if only one of the transparent clocks operates in this manner.

Preferably the step of computing modified residence times uses a filtered value of the skew, for example using an exponentially weighted moving average filter.

In certain embodiments the transparent clock device is capable of hardware timestamping arriving and outgoing timing messages, and the processor is arranged to extract the residence time by: extracting the residence time recorded in the timing messages sent from the master device to the slave device on arrival in the transparent clock device; and extracting the residence time recorded in the timing messages sent from the slave device to the master device on departure from the transparent clock device and the total residence time recorded between the slave device and the master device.

In such "one-step clock" arrangements, the residence time in transparent clocks between the master device and the transparent clock device itself in the forward direction between the master and the slave can be determined from the residence time recorded in a timing message when it arrives at the transparent clock. The residence time in the same transparent clocks in the reverse direction (slave to master) is the difference between the residence time for all transparent clocks between the slave and the message leaving the transparent clock device itself and the total residence time for the entire journey from slave to master.

In certain embodiments the transparent clock device is not capable of hardware timestamping the arriving and outgoing timing messages, wherein: for each first timing message (e.g. an IEEE 1588 PTP "Sync" message) sent from the master device to the slave device, sending a first further timing message (e.g. an IEEE 1588 PTP "Follow_Up" message) from the master device to the slave device which contains the time of sending of the respective first timing message by the master device, and to which is cumulatively added, by each transparent clock that the further timing message passes through, a first residence time being the time taken for the respective first timing message to pass through each said transparent clock device; and for each second timing message (e.g. an IEEE 1588 PTP "Delay_Req" message) sent from the slave device to the master device, sending a second further timing message (e.g. an IEEE 1588 PTP "Delay_Resp" message) from the master device to the slave device which contains the time of receipt of the respective second timing message by the master device, and to which is cumulatively added, by each transparent clock that the second further timing message passes through, a second residence time being the time taken for the respective second timing message to pass through each said transparent clock device, and wherein the processor is arranged to extract the residence time by: extracting the first residence time recorded in one of said first further timing messages; and extracting the second residence time recorded in one of said second further timing messages on receipt of the second further timing message at the transparent clock device.

In such "two-step clock" arrangements, the residence time in transparent clocks between the master device and the transparent clock device itself in the forward direction between the master and the slave can be determined from the residence time recorded in the first further timing message (e,g. "Follow_Up" message) when it arrives at the transparent clock. The residence time in the same transparent clocks in the reverse direction (slave to master) is recorded by the transparent clocks as the message (e.g. "Delay_Req" message) passes through those transparent clocks, but is added to the second further timing message (e.g. "Delay_Resp" message) when it is returned to the slave.

In certain embodiments the processor is arranged to estimate the skew of the local clock using a linear approximation. For example the estimation may be done by: calculating a component $\alpha_1$ of the skew in the forward direction from master device to slave device as:

$$\alpha_1 = \frac{(T_{1,n} - T_{1,n-1}) + (r_{ftotal,n} - r_{ftotal,n-1})}{(T_{2TC,n} - T_{2TC,n-1})} - 1$$

wherein $T_{1,n}$ is the departure time of the nth timing message sent from the master device to the slave device, $T_{2TC,n}$ is the arrival time of the nth timing message sent from the master device to the slave device at the transparent clock device and $r_{ftotal,n}$ is the cumulative residence time of the nth timing message sent from the master device to the slave device in other transparent clock devices whilst travelling between the master device and the transparent clock device, calculating a component $\alpha_2$ of the skew in the reverse direction from slave device to master device as:

$$\alpha_2 = \frac{(T_{4,n} - T_{4,n-1}) - (r_{rtotal,n} - r_{rtotal,n-1})}{(T_{3TC,n} - T_{3TC,n-1})} - 1$$

wherein $T_{4,n}$ is the arrival time of the nth timing message sent from the slave device to the master device, $T_{3TC,n}$ is the departure time of the nth timing message sent from the slave device to the master device from the transparent clock device and $r_{rtotal,n}$ is the cumulative residence time of the nth timing message sent from the slave device to the master device in other transparent clock devices whilst travelling between the transparent clock device and the master device, and estimating the skew as the average of $\alpha_1$ and $\alpha_2$.

In certain embodiments the processor is arranged to estimate the skew of the local clock by operating a Kalman filter. For example a Kalman filter may be operated using the measurement equation $$\underbrace{(T_{1,n} - T_{2TC,n}) + (T_{4,n} - T_{3TC,n}) + (d_f - d_r) + (r_{ftotal,n} - r_{rtotal,n})}_{y_n} =$$

$$\frac{2\theta_n}{D_n X_n} + \frac{(\gamma_n - \varepsilon_n)}{v_n}$$

wherein $\theta_n$ and $\alpha_n$ are the total offset and skew during the nth exchange of timing messages, $T_{1,n}$ is the departure time of the nth timing message sent from the master device to the slave device, $T_{2TC,n}$ is the arrival time of the nth timing message sent from the master device to the slave device at the transparent clock device $T_{4,n}$ is the arrival time of the nth timing message sent from the slave device to the master device, $T_{3TC,n}$ is the departure time of the nth timing message sent from the slave device to the master device from the transparent clock device, $r_{ftotal,n}$ is the cumulative residence time of the nth timing message sent from the master device to the slave device in other transparent clock devices whilst travelling between the master device and the transparent clock device, $r_{rtotal,n}$ is the cumulative residence time of the nth timing message sent from the slave device to the master device in other transparent clock devices whilst travelling between the transparent clock device and the master device, $d_f$ and $d_r$ are the fixed delays in the directions from master device to slave device and slave device to master devices respectively, $y_n = (T_{1,n} - T_{2TC,n}) + (T_{4,n} - T_{3TC,n}) + (d_f - d_r) + (r_{ftotal,n} - r_{rtotal,n})$ is a scalar, n is a nonnegative time index, $D_n = [2\ 0]$ is a 1×2 matrix, $X_n^T = [\theta_n\ \alpha_n]$ is a vector, and $v_n = (\gamma_n - \varepsilon_n)$ is the measurement noise, and using the state equation:

$$X_n = \begin{bmatrix} \theta_n \\ \alpha_n \end{bmatrix} = \begin{bmatrix} 1 & (T_{2TC,n} - T_{2TC,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = A_n X_{n-1} + w_n$$

where $w_n^T = [w_{\theta,n}\ w_{\alpha,n}]$ is a process noise vector.

Embodiments using a Kalman filter such as that above can also estimate the offset of the local clock compared to the master clock.

The device of the present aspect may include any combination of some, all or none of the above described preferred and optional features.

A third aspect of the present invention provides a networked time system including a master device having a master clock and a slave device, a network connecting the master device to the slave device and an end-to-end transparent clock device located in the network between the master device and the slave device and having a local clock, wherein: the master device and slave device are arranged to exchange timing messages over the network, the timing messages passing through said transparent clock device; the master device is arranged to record times of sending and receiving of said timing messages at the master device; the transparent clock device includes a local clock and a processor, and the processor is arranged to: extract, from timing messages sent from the master device to the slave device, the times of sending and receiving of said timing messages; record the times of receipt by the transparent clock device of timing messages sent from the master device to the slave device; record the times of sending by the transparent clock device of timing messages sent from the slave device to the master device; extract, from the timing messages, the residence time of the timing messages in other transparent clock devices between the master device and the transparent clock device; and estimate the skew of the local clock compared to the master clock using a plurality of each of said extracted and recorded times.

In this way the skew of the local clock can be accurately estimated using the existing pattern of timing messages exchanged between the master and slave devices and without the need for physical synchronization or use of separate timing messages.

Further, by taking account of the message flows in both the forward (master to slave) and reverse (slave to master) direction, a more accurate estimation of the skew of the local clock may be obtained.

Preferably the timing messages are messages under the IEEE 1588 PTP.

Preferably the processor is further arranged to syntonize the local clock to the master clock. By syntonizing (synchronizing the frequency) the local clock to the master clock, the timing information provided by the transparent clock can be made more accurate, but without the need for physical syntonization. The syntonization can be achieved by post-processing the output of a free-running local clock.

Preferably the processor is further arranged to compute modified residence times in the transparent clock device using the estimated skew of the local clock. By computing more accurate residence times in the transparent clock device, the accuracy of the synchronization of a clock in the slave device to the master clock can be improved as more accurate information regarding the delays in the network between the master and the salve device can be provided. Ideally, all transparent clocks between the master and the slave would compute modified residence times in this manner, but improvements will result even if only one of the transparent clocks operates in this manner.

Preferably the step of computing modified residence times uses a filtered value of the skew, for example using an exponentially weighted moving average filter.

In certain embodiments the master device and transparent clock device are capable of hardware timestamping arriving and outgoing timing messages, the processor is arranged to extract the residence time by: extracting the residence time recorded in the timing messages sent from the master device to the slave device on arrival in the transparent clock device; and extracting the residence time recorded in the timing messages sent from the slave device to the master device on departure from the transparent clock device and the total residence time recorded between the slave device and the master device.

In such "one-step clock" arrangements, the residence time in transparent clocks between the master device and the transparent clock device itself in the forward direction between the master and the slave can be determined from the residence time recorded in a timing message when it arrives at the transparent clock. The residence time in the same transparent clocks in the reverse direction (slave to master) is the difference between the residence time for all transparent clocks between the slave and the message leaving the transparent clock device itself and the total residence time for the entire journey from slave to master.

In certain embodiments the master device and transparent clock device are not capable of hardware timestamping the arriving and outgoing timing messages, wherein the master device is further arranged to: for each first timing message (e.g. an IEEE 1588 PTP "Sync" message) sent from the master device to the slave device, send a first further timing message (e.g. an IEEE 1588 PTP "Follow_Up" message) from the master device to the slave device which contains the time of sending of the respective first timing message by the master device, and to which is cumulatively added, by each transparent clock that the further timing message passes through, a first residence time being the time taken for the respective first timing message to pass through each said transparent clock device; and for each second timing message (e.g. an IEEE 1588 PTP "Delay_Req" message) sent from the slave device to the master device, send a second further timing message (e.g. an IEEE 1588 PTP "Delay_Resp" message) from the master device to the slave device which contains the time of receipt of the respective second timing message by the master device, and to which is cumulatively added, by each transparent clock that the second further timing message passes through, a second residence time being the time taken for the respective second timing message to pass through each said transparent clock device, and wherein the processor is further arranged to: extract the first residence time recorded in one of said first further timing messages; and extract the second residence time recorded in one of said second further timing messages on receipt of the second further timing message at the transparent clock device.

In such "two-step clock" arrangements, the residence time in transparent clocks between the master device and the transparent clock device itself in the forward direction between the master and the slave can be determined from the residence time recorded in the first further timing message (e.g. "Follow_Up" message) when it arrives at the transparent clock. The residence time in the same transparent clocks in the reverse direction (slave to master) is recorded by the transparent clocks as the message (e.g. "Delay_Req" message) passes through those transparent clocks, but is added to the second further timing message (e.g. "Delay_Resp" message) when it is returned to the slave.

In certain embodiments the processor is arranged to estimate the skew of the local clock using a linear approximation. For example, the estimation may be done by: calculating a component $\alpha_1$ of the skew in the forward direction from master device to slave device as:

$$\alpha_1 = \frac{(T_{1,n} - T_{1,n-1}) - (r_{ftotal,n} - r_{ftotal,n-1})}{(T_{2TC,n} - T_{2TC,n-1})} - 1$$

wherein $T_{1,n}$ is the departure time of the nth timing message sent from the master device to the slave device, $T_{2TC,n}$ is the arrival time of the nth timing message sent from the master device to the slave device at the transparent clock device and $r_{ftotal,n}$ is the cumulative residence time of the nth timing message sent from the master device to the slave device in other transparent clock devices whilst travelling between the master device and the transparent clock device, calculating a component $\alpha_2$ of the skew in the reverse direction from slave device to master device as:

$$\alpha_2 = \frac{(T_{4,n} - T_{4,n-1}) - (r_{rtotal,n} - r_{rtotal,n-1})}{(T_{3TC,n} - T_{3TC,n-1})} - 1$$

wherein $T_{4,n}$ is the arrival time of the nth timing message sent from the slave device to the master device, $T_{3TC,n}$ is the departure time of the nth timing message sent from the slave device to the master device from the transparent clock device and $r_{rtotal,n}$ is the cumulative residence time of the nth timing message sent from the slave device to the master device in other transparent clock devices whilst travelling between the transparent clock device and the master device, and estimating the skew as the average of $\alpha_1$ and $\alpha_2$.

In certain embodiments the processor is further arranged to estimate the skew of the local clock by operating a Kalman filter. For example the Kalman filter may be operated using the measurement equation $$\underbrace{(T_{1,n} - T_{2TC,n}) + (T_{4,n} - T_{3TC,n}) + (d_f - d_r) + (r_{ftotal,n} - r_{rtotal,n})}_{y_n} =$$

$$\underbrace{\frac{2\theta_n}{D_n X_n}}_{} + \underbrace{(\gamma_n - \varepsilon_n)}_{v_n}$$

wherein $\theta_n$ and $\alpha_n$ are the total offset and skew during the nth exchange of timing messages, $T_{1,n}$ is the departure time of the nth timing message sent from the master device to the slave device, $T_{2TC,n}$ is the arrival time of the nth timing message sent from the master device to the slave device at the transparent clock device $T_{4,n}$ is the arrival time of the nth timing message sent from the slave device to the master device, $T_{3TC,n}$ is the departure time of the nth timing message sent from the slave device to the master device from the transparent clock device, r ftotal,n is the cumulative residence time of the nth timing message sent from the master device to the slave device in other transparent clock devices whilst travelling between the master device and the transparent clock device, $r_{rtotal,n}$ is the cumulative residence time of the nth timing message sent from the slave device to the master device in other transparent clock devices whilst travelling between the transparent clock device and the master device, $d_f$ and $d_r$ are the fixed delays in the directions from master device to slave device and slave device to master devices respectively, $y_n = (T_{1,n} - T_{2TC,n}) + (T_{4,n} - T_{3TC,n}) + (d_f - d_r) + (r_{ftotal,n} - r_{rtotal,n})$ is a scalar, n is a nonnegative time index, $D_n = [2\ 0]$ is a 1×2 matrix, $X_n^T = [\theta_n\ \alpha_n]$ is a vector, and $v_n = (\gamma_n - \varepsilon_n)$ is the measurement noise, and using the state equation:

$$X_n = \begin{bmatrix} \theta_n \\ \alpha_n \end{bmatrix} = \begin{bmatrix} 1 & (T_{2TC,n} - T_{2TC,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = A_n X_{n-1} + w_n$$

where $w_n^T = [w_{\theta,n}\ w_{\alpha,n}]$ is a process noise vector.

Embodiments using a Kalman filter such as that above can also estimate the offset of the local clock compared to the master clock.

The system of the present aspect may include any combination of some, all or none of the above described preferred and optional features.

Clock Skew Estimation and Residence Time Measurement Correction at the End-to-End Transparent Clocks In the present embodiments it is assumed that a free-running local oscillator is used at a TC. The frequency of this TC local oscillator is not adjusted physically, but it is allowed to free-run. This free-running oscillator drives a counter which is in turn used for timestamping at the TC and for the uncorrected measurement of the residence times of PTP messages.

Basic Clock Model

Figure 6:
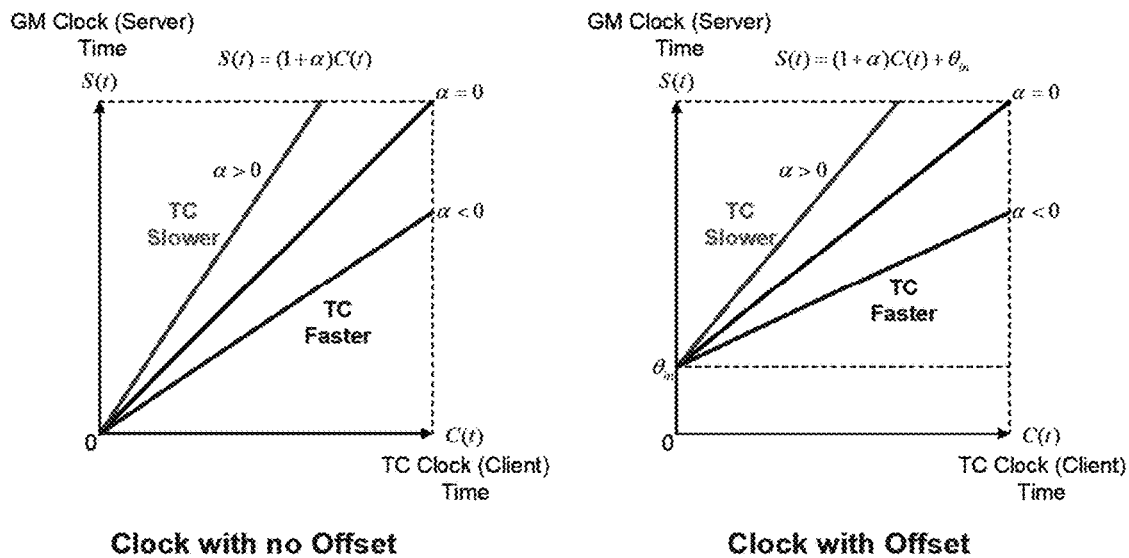
FIG. 6 shows the relationship between GrandMaster and transparent clocks with offset and skew.

First a generalized clock offset and skew equation can be defined for the synchronization problem. It is assumed that at any particular time instant, the instantaneous view of the relationship between the GM/master (server) clock with timeline S(t) and the TC (client) clock with timeline C(t), can be described by the well-known simple skew clock model depicted in FIG. 6, and described by the equation, $$S(t) = (1+\alpha)C(t) + \theta_{in}, \quad (2)$$

where $\theta_{in}$ is the initial time offset and $\alpha$ is the skew (frequency offset) which is a very small quantity in the order of parts-per-million. For example, oscillators used in Ethernet interfaces are required to have skew $\alpha$ of no more than ±100 ppm. This snapshot is an instantaneous view of how well the two clocks are (mis)aligned. FIG. 6 illustrates the influence of $\theta_{in}$ and a on the alignment.

Equation (2) can further be expressed as $$S(t) - C(t) = \theta(t) = \alpha C(t) + \theta_{in}, \quad (3)$$

where $\theta(t) = \alpha C(t) + \theta_{in}$ is the total offset at any particular time t>0. This time varying offset which reflects the true offset between the two clocks consists of two components, one being $\theta_{in}$ the (fixed) initial offset, and the other $\alpha C(t)$ which is an offset that arises as a result of the non-zero skew between the two clocks. Time synchronization in this sense will require knowing accurately the total offset $\theta(t)$ or, equivalently, its constituent components $\alpha$ and $\theta_{in}$, when given any C(t) value.

Mechanism for Intercepting and Capturing Timestamps at the End-to-End Transparent Clock TCs are capable of intercepting PTP messages and capturing embedded and external TC triggered timestamps. That is, a TC is capable of snooping on PTP messages passing through it. Assume there are K TCs 6 between the GM 1 and the slave 3. The following process takes place at the kth TC, $1 \le k \le K$:

For Sync Messages:
1. TC 6 captures its ingress timestamp $T_{2TC}$ of the arriving Sync message sent from GM 1 to slave 3.
2. TC 6 captures the embedded correctionField value $r_{ftotal}$ in the Sync/Follow_Up message sent from GM 1 to slave 3. The total residence time $r_{ftotal}$ does not include the residence time of the TC under consideration.
3. TC 6 captures the embedded $T_1$ timestamp in the Sync or Follow_Up message sent from GM 1 to slave 3,
    a. For the one-step clock:
        $T_1$ is in the originTimestamp field of Sync message and residence time $r_{ftotal}$ is in correctionField field of Sync message.
    b. For the two-step clock:
        $T_1$ is in the preciseOriginTimestamp field of Follow_Up message and residence time $r_{ftotal}$ is in correctionField field of Follow_Up message.

For Delay_Req Messages:
1. TC 6 captures its egress timestamp $T_{3TC}$ of the departing Delay_Req message sent from slave 3 to GM 1.
2. TC 6 captures the embedded T, timestamp in the arriving Delay_Resp message sent from GM 1 to slave 3.
3. Capture of correctionField value:
    a. For the one-step clock:
        Note that the residence time at a TC is added to the correctionField of the Delay_Req message by the egress port of the TC clock as the Delay_Req message is being transmitted.
        So the TC 6 captures (at the egress port) the embedded correctionField value $r_a$ in Delay_Req message sent from slave 3 to GM 1. TC 6 also captures the embedded correctionField value $r_b$ in Delay_Resp message sent from GM 1 to slave 3. Note that the Delay_Resp message carries the total path residence time ($r_b$) experienced by the Delay_Req message from slave 3 to GM 1. Thus the GM to TC total residence time is $r_{rtotal} = r_b - r_a$. The total residence time $r_b$ does not include the residence time of the TC under consideration.
    b. For the two-step clock:
        The received Delay_Req message at the TC 6 is transmitted from the egress port. The residence time is added to the correctionField of the Delay_Resp message associated with the Delay_Req message prior to transmission of the Delay_Resp message on the egress port.
        TC 6 captures (at the ingress port) the embedded correctionField value $r_{rtotal}$ in Delay_Resp message sent from GM 1 to slave 3. The value in this field reflects only the total GM to TC residence time. The total residence time $r_{rtotal}$ does not include the residence time of the TC under consideration.

Figure 7:
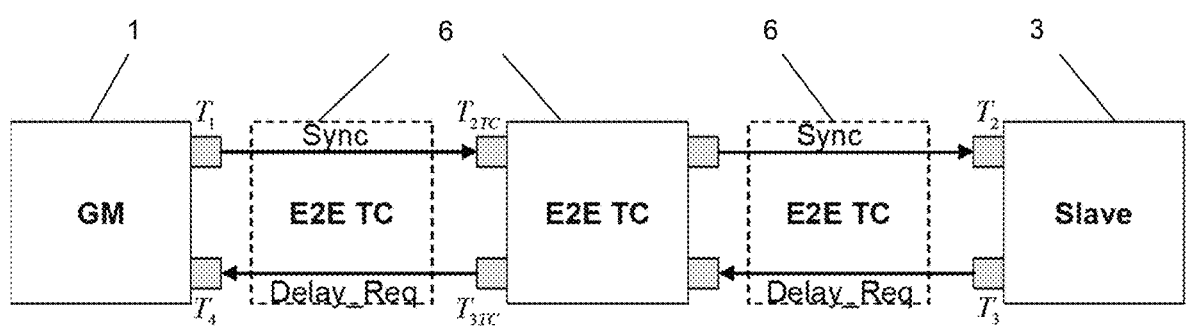
FIG. 7 illustrates the timestamps at the GrandMaster and at a transparent clock on the transmission path.
Figure 5:
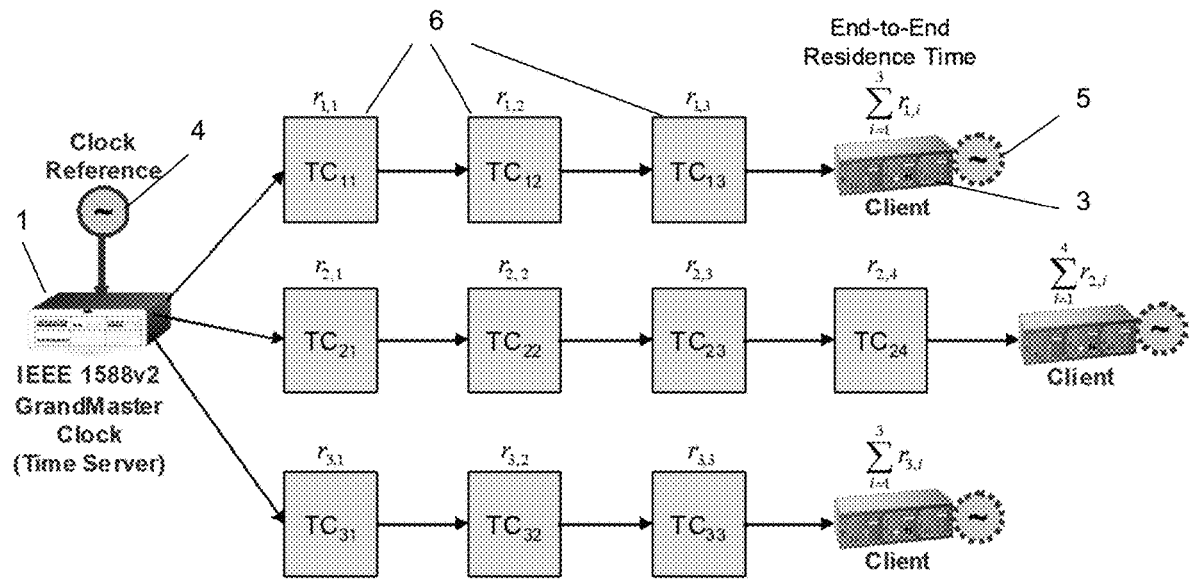
FIG. 5 shows the principles of time distribution using transparent clocks and has already been described.

The embedded and TC triggered timestamps captured at the TC 6 (as shown in FIG. 7) are used in the computation of the TC clock skew with respect to the GM 1. Techniques for estimating the skew according to embodiments of the present invention are described below.

Basic Network Synchronization Models

The basic clock model above can be extended to account for the case where the GM/master clock 4 and slave clock 5 exchange PTP messages and with messages intercepted and timestamps captured at a particular TC 6 as described above. The communication link between a GM 1 and a TC 6 has with it a fixed and random delay. The PTP messages pass through a network of one or multiple E2E TCs 6 from GM 1 to slave 3.

Assume the nth Sync message travelling from the GM 1 to the kth TC 6 experiences a fixed physical link (or propagation) delay of $d_f$ plus variable cumulative residence time of $r_{ftotal,n}$. Similarly, it is assumed the nth Delay_Req message traveling from the kth TC 6 to the GM 1 experiences a fixed delay of $d_r$ plus variable cumulative residence time of $r_{rtotal,n}$.

The GM 1 and slave 3 exchange messages using the delay-request delay-response mechanism described above and illustrated in FIG. 1. For the nth Sync message which departs the GM 1 with timestamp $T_{1,n} \in S(t)$ and arrives at the kth TC 6 with timestamp $T_{2TC,n} \in C(t)$ after having experienced delays of $d_f$ and $r_{ftotal,n}$, the simple skew clock model above can be extended to account for the travel time to obtain the following expression $$(T_{1,n} + d_f + r_{ftotal,n}) = (1+\alpha)T_{2TC,n} + \theta_{in} \quad (4)$$

For the nth Delay_Req message which departs the kth TC 6 with timestamp $T_{3TC,n} \in C(t)$ and arrives at the GM 1 with timestamp $T_{4,n} \in S(t)$ after having experienced delays of $d_r$ and $r_{rtotal,n}$, the following expression is obtained $$(T_{4,n} - d_r - r_{rtotal,n}) = (1+\alpha)T_{3TC,n} + \theta_{in} \quad (5)$$

A key assumption here is that the message exchanges occur over a period of time so small that the total offset $\theta$ (omitting here the time index t or n) and skew $\alpha$ can be assumed constant over that period. Two possible techniques for computing the offsets $\theta$, $\theta_{in}$ and skew $\alpha$ using the Sync and Delay_Req message exchanges are set out in more detail below.

Even though it is possible to compute both the offset and skew, the focus of these methods is syntonizing the TC by accurately estimating the skew. So the most important parameter here is the skew $\alpha$ which will be used to modify the residence time measurements at the TC so that they will be as close as possible to the ideal values (as if accurate TC clock syntonization is achieved).

Simple Linear Approximation Technique Skew Estimation at the E2E TCs

Adding equations (4) and (5) and rearranging gives the clock offset $\theta_{in}$ as $$\theta_{in} = \frac{(T_{1,n} + T_{4,n})(1+\alpha)(T_{2TC,n} + T_{3TC,n})(d_f + d_r) + (r_{ftotal,n} - r_{rtotal,n})}{2} = \quad (6)$$

$$\frac{(T_{1,n} + T_{4,n}) - (1+\alpha)(T_{2TC,n} + T_{3TC,n})}{2} + \frac{(d_f - d_r)}{2} \frac{(r_{ftotal,n} - r_{rtotal,n})}{2}$$

If the physical links between the GM and the kth TC are symmetric, then $d_f = d_r$ and $$\theta_{in} = \frac{(T_{1,n} + T_{4,n}) - (1+\alpha)(T_{2TC,n} + T_{3TC,n})}{2} + \frac{(r_{ftotal,n} - r_{rtotal,n})}{2} \quad (7)$$

As discussed above, since the focus of this method is syntonization, the aim is to estimate the skew using the Sync and Delay_Req messages. Let $\alpha_1$ denote the component of the skew that can be estimated from the Sync message exchange. For the (n−1) and nth Sync message exchange equation (4) above gives the following:

$$(T_{1,n-1} + d_f + r_{ftotal,n-1}) = (1+\alpha_1)T_{2TC,n-1} + \theta_{1n} \quad (8)$$

$$(T_{1,n} + d_f + r_{ftotal,n}) = (1+\alpha_1)T_{2TC,n} + \theta_{1n} \quad (9)$$

Subtracting (8) from (9) gives:

$$(T_{1,n} - T_{1,n-1}) + (r_{ftotal,n} - r_{ftotal,n-1}) = (1+\alpha_1)(T_{2TC,n} - T_{2TC,n-1}) \quad (10)$$

$$\alpha_1 = \frac{(T_{1,n} - T_{1,n}) + (r_{ftotal,n} - r_{ftotal,n-1})}{(T_{2TC,n} - T_{2TC,n1})} - 1 \quad (11)$$

Let $\alpha_2$ denote the component of the skew that can be estimated from the Delay_Req message exchange. For the (n−1) and nth Delay_Req message exchange equation (5) above gives the following:

$$(T_{4,n-1} + d_r + r_{rtotal,n-1}) = (1+\alpha_2)T_{3TC,n-1} + \theta_{1n} \quad (12)$$

$$(T_{4,n} + d_r + r_{rtotal,n}) = (1+\alpha_2)T_{3TC,n} + \theta_{1n} \quad (13)$$

Subtracting (12) from (13) gives:

$$(T_{4,n} - T_{4,n1}) - (r_{rtotal,n} - r_{rtotal,n-1}) = (1+\alpha_2)(T_{3TC,n} - T_{3TC,n-1}) \quad (14)$$

$$\alpha_2 = \frac{(T_{4,n} - T_{4,n-1}) - (r_{rtotal,n}\ r_{rtotal,n-1})}{(T_{3TC,n}\ T_{3TC,n-1})}1 \quad (15)$$

The skew $\alpha$ can then be estimated from $\alpha_1$ and $\alpha_2$ as $$\alpha = \frac{\alpha_1 + \alpha_2}{2} \quad (16)$$

If desired, the estimated skew $\alpha$ is then used to compute the clock offset $\theta_{in}$ as given in (6). If further desired at any given discrete time n, the estimated skew $\alpha$ and offset $\theta_{in}$ can be used to estimate the server time $S_n$ corresponding to a local clock value $C_n$.

The residence times can be estimated given the computed skew $\alpha$ and the ingress and egress timestamps generated upon PTP message arrivals using the free-running TC clock as follows. Let $C_{in}$ and $C_{eg}$ denote, respectively, the ingress and egress timestamps captured by the kth TC upon a PTP message arrival at any time instance. Let $\theta_{in}$ also denote the initial time offset of the TC clock with respect to the GM clock. Using (2), the following relationships can be derived:

$$S = (1+\alpha)C_{in} + \theta_{in} \quad (17)$$

$$S_{eg} = (1+\alpha)C_{eg} + \theta_{in} \quad (18)$$

In the above equations, the ingress and egress timestamps are mapped to the ideal time reference, which in this case is that of the GM. The mapped timestamps are then used to compute the modified (or close to idea) residence times at the TC as follows, $$r_{mod} = S_{eg} - S_{in} = (1+\alpha)(C_{eg} - C_{in}) \quad (19)$$

Note that in the above equation the raw uncorrected or skew uncompensated residence time is given by $$r_{raw} = (C_{eg} - C_{in}) \quad (20)$$

However, it can be seen from (19) that when the skew $\alpha=0$ (i.e., TC clock is perfectly syntonized to GM), then the raw residence times are the same as the ideal or modified ones, that is, $$r_{mod} = S_{eg} - S_{in} = (C_{eg} - C_{in}) = r_{raw} \quad (21)$$

To compute the modified residence times ($r_{mod}$), filtered values of the skew ($\hat{\alpha}$) preferably should be used. The filtering can be done using a simple exponentially weighted moving average (EWMA) filter $$\hat{\alpha}_n = \mu\alpha_n + (1-\mu)\hat{\alpha}_{n-1}, \ 0 < \mu < 1 \quad (22)$$

It can be seen from the above discussion that when using a TC with a free-running clock, only knowledge of the estimated skew is important when estimating the ideal residence times. The EWMA filter described here is a relatively simple estimating technique for the skew estimation. To improve the residence time estimates, a more advanced filtering scheme based on Kalman Filtering for the skew estimation is set out below.

Kalman Filter Based Technique for Skew Estimation at the E2E TCs

Although, as indicated, the primary interest is in the skew, the models described below can be used with a Kalman filter-based technique to estimate the clock offset and skew. The Kalman filter [1] allows the use of measurements of a process observed over time, containing noise and other inaccuracies, to produce values (estimates) that tend to be closer to the true values of the measurements and their associated calculated values. The Kalman filter produces estimates of the true values of measurements and their associated calculated values by predicting a value, estimating the uncertainty of the predicted value, and computing a weighted average of the predicted value and the measured value.

In order to use the Kalman filter to estimate the internal state of a process given only a sequence of noisy observations, the process must be modeled in accordance with the framework of the Kalman filter. Therefore consider a state-space model described by the following pair of equations State Equation: $X_n = A_n X_{n-1} + w_n$, (23)

Measurement Equation: $y_n = D_n X_n + v_n$, (24)

where n is a nonnegative time index, $A_n$ is a known M-by-M state transition matrix, $X_n$ is the M-dimensional state (or parameter) vector, $w_n$ is an M-dimensional process noise vector which is assumed to be drawn from a zero mean multivariate normal distribution with covariance $Q_n = E[w_n w_n^T]$, $w_n \sim N(0, Q_n)$ is the measurement, $D_n$ is a known 1×M-dimensional measurement matrix which maps the true state space into the measurement space, $v_n$ is the measurement noise which is assumed to be zero mean Gaussian white noise with covariance $R_n = E[v_n v_n^T]$, $v_n \sim N(0, R_n)$, and T denotes transpose. It is assumed in the model that the initial state, and the noise vectors at each step $\{X_0, w_1, \ldots, w_n, v_1, \ldots, v_n\}$ are mutually independent.

The notation $\hat{X}_{n,m}$ used below represents the estimate of X at time n given observations up to, and including at time m. The Kalman filter equations are most often conceptualized as two distinct phases: Predict and Update as described below.

Predict Phase:

The predict phase uses the state estimate from the previous time step to produce an estimate of the state at the current time step.

Predicted (a priori) state estimate:

$$\hat{X}_{n,n-1} = A_n \hat{X}_{n-1,n-1} \quad (25)$$

This predicted state estimate is also known as the a priori state estimate because, although it is an estimate of the state at the current time step, it does not include observation information from the current time step.

Predicted (a priori) estimate covariance:

$$P_{n,n-1} = A_n P_{n-1,n-1} A_n^T + Q_n \quad (26)$$

Update Phase:

In the update phase, the current a priori prediction is combined with current observation information to refine the state estimate. This improved estimate is termed the a posteriori state estimate.

Innovation or measurement residual:

$$\tilde{z}_n = y_n - D_n \hat{X}_{n,n-1} \quad (27)$$

Innovation (or residual) covariance:

$$S_n = D_n P_{n,n-1} D_n^T + R_n \quad (28)$$

Optimal Kalman gain:

$$K_n = P_{n,n-1} D_n^T S_n^{-1} = P_{n,n-1} D_n^T [D_n P_{n,n-1} D_n^T + R_n]^{-1} \quad (29)$$

Updated (a posteriori) state estimate:

$$\hat{X}_{n,n} = \hat{X}_{n,n-1} + K_n \tilde{z}_n = \hat{X}_{n,n-1} + K_n(y_n - D_n \hat{X}_{n,n-1}) \quad (30)$$

This is the a posteriori state estimate at time n given observations up to and including at time n. The second term in the above equation is called the correction term and it represents the amount by which to correct the propagated state estimate due to the measurement. Inspection of the Kalman gain equation shows that if the measurement noise is large, $R_n$ will be large, so that $K_n$ will be small and not much credibility would be given to the measurement y when computing the next $\hat{X}$. On the other hand, if the measurement noise is small, $R_n$ will be small, so that $K_n$ will be large and a lot of credibility will be given to the measurement when computing the next $\hat{X}$.

Updated (a posteriori) estimate covariance:

$$P_{n,n} = (I - K_n D_n) P_{n,n-1} \quad (31)$$

This is the a posteriori error covariance matrix (a measure of the estimated accuracy of the state estimate).

Typically, the two phases alternate, with the prediction advancing the state until the next scheduled observation, and the update incorporating the observation. Practical implementation of the Kalman Filter requires getting a good estimate of the noise covariance matrices $Q_n$ and $R_n$.

Development of the Measurement Equation

Assume a Sync message travelling from a GM 1 to the kth TC 6 experiences a fixed delay d, variable cumulative residence time $r_{ftotal}$, plus a stochastic delay ε (to account for all other delay components in the system). Similarly, assume a Delay_Req message leaving the TC 6 to the GM 1 experiences a fixed delay of d, variable cumulative residence time $r_{rtotal}$, and a variable stochastic delay γ. It is assumed, for the moment, that the fixed delay components in both directions are equal, $d_f = d_r = d$ (symmetric communication paths) but the messages experience variables delays such queuing delays. The variables $\theta_n$ and $\alpha_n$ are the total offset and skew during the nth Sync message exchange. Equations (4) and (5) above can be rewritten to account for the above conditions with the following equations $$(T_{1,n} + d + r_{ftotal,n} + \varepsilon_n) = (1+\alpha_n) T_{2TC,n} + \theta_{in} \quad (32)$$

$$(T_{4,n} - d - r_{rtotal,n} + \gamma_n) = (1+\alpha_n) T_{3TC,n} + \theta_{in} \quad (33)$$

It can be seen from equation (3) above that for a given reading of $C_n$, the total offset is $\theta_n = \alpha_n C_n + \theta_{in}$. A key assumption here is the total offset $\theta_n$ stays constant between Sync message exchanges as stated earlier above. With this and assuming further that the $T_{2TC,n} \in C(t)$ and $T_{3TC,n} \in C(t)$ timestamps are captured closer together within any two Sync message exchanges, the total offset $\theta_n$ in that interval can be defined as $$\theta_n = \alpha_n T_{2TC,n} + \theta_{in} \approx \alpha_n T_{3TC,n} + \theta_{in} \quad (34)$$

With the above definitions in mind, $$(T_{1,n} + d + r_{ftotal,n} + \varepsilon_n) = T_{2TC,n} + \theta_n \quad (35)$$

$$(T_{4,n} - d - r_{rtotal,n} + \gamma_n) = T_{3TC,n} + \theta_n \quad (36)$$

Adding (35) and (36) gives the measurement equation as $$(T_{1,n} + T_{4,n}) + (r_{ftotal,n} - r_{rtotal,n}) + (\varepsilon_n - \gamma_n) = (T_{2TC,n} + T_{3TC,n}) + 2\theta_n$$

$$(T_{1,n} - T_{2TC,n}) + (T_{4,n} - T_{3TC,n}) + (r_{ftotal,n} - r_{rtotal,n}) = 2\theta_n + (\gamma_n - \varepsilon_n) \quad (37)$$

The measurement equation above can be rewritten as $$\underbrace{(T_{1,n} - T_{2TC,n}) + (T_{4,n} - T_{3TC,n}) + (d_f - d_r) + (r_{ftotal,n} - r_{rtotal,n})}_{y_n} = \quad (38)$$

$$\frac{2\theta_n}{D_n X_n} + \underbrace{(\gamma_n - \varepsilon_n)}_{v_n}$$

where n is a nonnegative time index, $y_n = (T_{1,n} - T_{2TC,n}) + (T_{4,n} - T_{3TC,n}) + (r_{ftotal,n} - r_{rtotal,n})$ is a scalar, $D_n = [2\ 0]$ is a 1×2 matrix, $X_n^T = [\theta_n\ \alpha_n]$ is a vector, and $v_n = (\gamma_n - \varepsilon_n)$ is the measurement noise.

Alternatively, in the case where the forward delay $d_f$ and reverse delay $d_r$ are unequal but are known (see equations (4) and (5)), the measurement equation can be obtained as $$\underbrace{(T_{1,n} - T_{2TC,n}) + (T_{4,n} - T_{3TC,n}) + (d_f - d_r) + (r_{ftotal,n} - r_{rtotal,n})}_{y_n} = \quad (39)$$

$$\frac{2\theta_n}{D_n X_n} + \underbrace{(\gamma_n - \varepsilon_n)}_{v_n}$$

where $y_n = (T_{1,n} - T_{2TC,n}) + (T_{4,n} - T_{3TC,n}) + (d_f - d_r) + (r_{ftotal,n} - r_{rtotal,n})$ is a scalar. The quantity $(d_f - d_r)$ accounts for the fixed delay asymmetry in the system. The above more general equation allows for known delays and asymmetries to be accounted for in the Kalman Filter formulation.

The nth sampling interval is considered to be the period in which the nth Sync and nth Delay_Req messages exchanges occur.

Development of the State (Process) Equation

Here the TC clock (process) model parameters $A_n$ and $w_n$ are derived. The clock skew over two time points $T_{2,n}$ and $T_{2,n-1}$ can be estimated given two clock offsets $\theta_n$ and $\theta_{n-1}$ as $$\alpha_{n-1} = \frac{\theta_n - \theta_{n-1}}{T_{2,n} - T_{2,n-1}}. \quad (40)$$

The process dynamics for the clock while accounting for process noise can then be expressed as:

$$\theta_n = \theta_{n-1} + \alpha_{n-1}(T_{2,n} - T_{2,n-1})w_{\theta,n}$$

$$\alpha_n = \alpha_{n-1} + w_{\alpha,n} \quad (41)$$

where $w_n^T = [w_{\theta,n} \ w_{\alpha,n}]$ is the process noise vector which is assumed to be drawn from a zero mean normal distribution with covariance $Q_n = E[w_n w_n^T]$. The system can be described by the following two-state dynamic model $$X_n = \quad (42)$$

$$\begin{bmatrix} \theta_n \\ \alpha_n \end{bmatrix} = \begin{bmatrix} 1 & (T_{2TC,n} - T_{2TC,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = A_n X_{n-1} + w_n,$$

where $A_n$ is the known 2-by-2 state transition matrix. If the time between Sync messages is fixed as would be the case when a constant Sync departure rate is configured at the GM $(T_{1,n} - T_{1,n-1}) = \Delta t$, then, $\Delta T_n = (T_{2TC,n} - T_{2TC,n-1}) = \Delta t$ is a constant term, and $$A_n = A = \begin{bmatrix} 1 & (T_{1,n} - T_{1,n-1}) \\ 0 & 1 \end{bmatrix} = \begin{bmatrix} 1 & \Delta t \\ 0 & 1 \end{bmatrix} \quad (43)$$

In reality, $A_n$ is not a fixed matrix because of the variable message delays experienced in the system, thus making (42) the most appropriate expression to be used at each iteration. The clock skew ($\alpha$) estimated at the TC using any of the two techniques described above can be used to compute the modified residence times as given by (19). To achieve time synchronization or equivalently find the server time estimate $S_n$ (although not required in this context), the estimate $\gamma_n$ from the Kalman Filter can be used in (3) to obtain $S_n$, that is, $S_n = C_n + \theta_n$.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. R. E. Kalman, "A New Approach to Linear Filtering and Prediction Problems," *Transaction of the ASME—Journal of Basic Engineering*, March 1960, pp. 35-45.

All references referred to above are hereby incorporated by reference.

What is claimed is:

1. A method of estimating the skew of a local clock in an end-to-end transparent clock device connected in a network between a master device having a master clock and a slave device, the method including the steps of:
    exchanging timing messages between the master device and the slave device over the network, the timing messages passing through said transparent clock device;
    recording times of sending and receiving of said timing messages by the master device;
    extracting, in the transparent clock device, from timing messages sent from the master device to the slave device, the times of sending and receiving of said timing messages;
    recording the times of receipt by the transparent clock device of timing messages sent from the master device to the slave device;
    recording the times of sending by the transparent clock device of timing messages sent from the slave device to the master device;
    extracting, in the transparent clock device, from the timing messages, the residence time of the timing messages in other transparent clock devices between the master device and the transparent clock device;
    with the transparent clock device: measuring message residence time for the transparent clock device, modifying an incoming correction field with at least the measured message residence time to generate a modified correction field, and sending the modified correction field to the slave device; and
    estimating, in the transparent clock device, the skew of the local clock in the transparent clock device compared to the master clock using a plurality of each of said extracted and recorded times.

2. A method according to claim 1, further including the step of syntonizing the local clock in the transparent clock device to the master clock and syntonizing a slave clock in the slave device to the master clock.

3. A method according to claim 1, further including the step of computing modified residence times in the transparent clock device using the estimated skew of the local clock.

4. A method according to claim 1, wherein the master device and transparent clock device are capable of hardware timestamping arriving and outgoing timing messages, and the step of extracting the residence time includes:
   extracting the residence time recorded in the timing messages sent from the master device to the slave device on arrival in the transparent clock device; and
   extracting the residence time recorded in the timing messages sent from the slave device to the master device on departure from the transparent clock device and the total residence time recorded between the slave device and the master device.

5. A method according to claim 1, wherein the master device and transparent clock device are not capable of hardware timestamping the arriving and outgoing timing messages, the method further including the steps of:
   for each first timing message sent from the master device to the slave device, sending a first further timing message from the master device to the slave device which contains the time of sending of the respective first timing message by the master device, and to which is cumulatively added, by each transparent clock that the further timing message passes through, a first residence time being the time taken for the respective first timing message to pass through each said transparent clock device; and
   for each second timing message sent from the slave device to the master device, sending a second further timing message from the master device to the slave device which contains the time of receipt of the respective second timing message by the master device, and to which is cumulatively added, by each transparent clock that the second further timing message passes through, a second residence time being the time taken for the respective second timing message to pass through each said transparent clock device,
   and wherein the step of extracting the residence time includes:
   extracting the first residence time recorded in one of said first further timing messages; and
   extracting the second residence time recorded in one of said second further timing messages on receipt of the second further timing message at the transparent clock device.

6. A method according to claim 1 wherein the step of estimating the skew of the local clock includes:
   calculating a component $\alpha_1$ of the skew in the forward direction from master device to slave device as:

$$\alpha_1 = \frac{(T_{1,n} - T_{1,n-1}) + (r_{ftotal,n} - r_{ftotal,n-1})}{(T_{2TC,n} - T_{2TC,n-1})} - 1$$

wherein $T_{1,n}$ is the departure time of the nth timing message sent from the master device to the slave device, $T_{2TC,n}$ is the arrival time of the nth timing message sent from the master device to the slave device at the transparent clock device and $r_{ftotal,n}$ is the cumulative residence time of the nth timing message sent from the master device to the slave device in other transparent clock devices whilst travelling between the master device and the transparent clock device, calculating a component $\alpha_2$ of the skew in the reverse direction from slave device to master device as:

$$\alpha_2 = \frac{(T_{4,n} - T_{4,n-1}) + (r_{rtotal,n} - r_{rtotal,n-1})}{(T_{3TC,n} - T_{3TC,n-1})} - 1$$

wherein $T_{4,n}$ is the arrival time of the nth timing message sent from the slave device to the master device, $T_{3TC,n}$ is the departure time of the nth timing message sent from the slave device to the master device from the transparent clock device and $r_{rtotal,n}$ is the cumulative residence time of the nth timing message sent from the slave device to the master device in other transparent clock devices whilst travelling between the transparent clock device and the master device, and estimating the skew as the average of $\alpha_1$ and $\alpha_2$.

7. A method according to claim 1 wherein the step of estimating the skew of the local clock includes operating a Kalman filter using the measurement equation $$\frac{(T_{1,n} - T_{2TC,n}) + (T_{4,n} - T_{3TC,n}) + (d_f - d_r) + (r_{ftotal,n} - r_{rtotal,n})}{y_n} =$$

$$\frac{2\theta_n}{D_n X_n} + \frac{(\gamma_n - \varepsilon_n)}{v_a}$$

wherein $\theta_n$ and $\alpha_n$ are the total offset and skew during the nth exchange of timing messages, $T_{1,n}$ is the departure time of the nth timing message sent from the master device to the slave device, $T_{2TC,n}$ is the arrival time of the nth timing message sent from the master device to the slave device at the transparent clock device $T_{4,n}$ is the arrival time of the nth timing message sent from the slave device to the master device, $T_{3TC,n}$ is the departure time of the nth timing message sent from the slave device to the master device from the transparent clock device, $r_{ftotal,n}$ is the cumulative residence time of the nth timing message sent from the master device to the slave device in other transparent clock devices whilst travelling between the master device and the transparent clock device, $r_{rtotal,n}$ is the cumulative residence time of the nth timing message sent from the slave device to the master device in other transparent clock devices whilst travelling between the transparent clock device and the master device, $d_f$ and $d_r$ are the fixed delays in the directions from master device to slave device and slave device to master devices respectively, $y_n = (T_{1,n} - T_{2TC,n}) + (T_{4,n} - T_{3TC,n}) + (d_f - d_r) + (r_{ftotal,n} - r_{rtotal,n})$ is a scalar, n is a nonnegative time index, $D_n = [2\ 0]$ is a 1×2 matrix, $X_n^T = [\theta_n\ \alpha_n]$ is a vector, and $v_n = (\gamma_n - \varepsilon_n)$ is the measurement noise, and using the state equation:

$$X_n = \begin{bmatrix} \theta_n \\ \alpha_n \end{bmatrix} = \begin{bmatrix} 1 & (T_{2TC,n} - T_{2TC,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = A_n X_{n-1} + w_n$$

where $w_n^T = [w_{\theta,n}\ w_{\alpha,n}]$ is a process noise vector.

8. An end-to-end transparent clock device for use in a network between a master device having a master clock and a slave device, the transparent clock device having:
   a local clock; and
   a processor, wherein the transparent clock device is arranged to:
receive and re-transmit timing messages sent in both directions between the master device and the slave device over the network,
and the processor is arranged to:
extract, from timing messages sent from the master device to the slave device, the times of sending and receiving of said timing messages;
record the times of receipt by the transparent clock device of timing messages sent from the master device to the slave device;
record the times of re-transmission by the transparent clock device of timing messages sent from the slave device to the master device;
extract, from the timing messages, the residence time of the timing messages in other transparent clock devices between the master device and the transparent clock device;
measure message residence time for the transparent clock device, modify an incoming correction field with at least the measured message residence time to generate a modified correction field, and send the modified correction field to the slave device; and
estimate the skew of the local clock in the transparent clock device compared to the master clock using a plurality of each of said extracted and recorded times.

9. A transparent clock device according to claim 8 wherein the processor is further arranged to syntonize the local clock in the transparent clock device to the master clock.

10. A transparent clock device according to claim 8 wherein the processor is further arranged to compute modified residence times in the transparent clock device using the estimated skew of the local clock.

11. A transparent clock device according to claim 8, wherein the transparent clock device is capable of hardware timestamping arriving and outgoing timing messages, and the processor is arranged to extract the residence time by:
extracting the residence time recorded in the timing messages sent from the master device to the slave device on arrival in the transparent clock device; and
extracting the residence time recorded in the timing messages sent from the slave device to the master device on departure from the transparent clock device and the total residence time recorded between the slave device and the master device.

12. A transparent clock device according to claim 8, wherein the transparent clock device is not capable of hardware timestamping the arriving and outgoing timing messages, wherein:
for each first timing message sent from the master device to the slave device, sending a first further timing message from the master device to the slave device which contains the time of sending of the respective first timing message by the master device, and to which is cumulatively added, by each transparent clock that the further timing message passes through, a first residence time being the time taken for the respective first timing message to pass through each said transparent clock device; and
for each second timing message sent from the slave device to the master device, sending a second further timing message from the master device to the slave device which contains the time of receipt of the respective second timing message by the master device, and to which is cumulatively added, by each transparent clock that the second further timing message passes through, a second residence time being the time taken for the respective second timing message to pass through each said transparent clock device,
and wherein the processor is arranged to extract the residence time by:
extracting the first residence time recorded in one of said first further timing messages; and
extracting the second residence time recorded in one of said second further timing messages on receipt of the second further timing message at the transparent clock device.

13. A transparent clock device according to claim 8 wherein the processor is arranged to estimate the skew of the local clock by:
calculating a component $\alpha_1$ of the skew in the forward direction from master device to slave device as:

$$\alpha_1 = \frac{(T_{1,n} - T_{1,n-1}) + (r_{ftotal,n} - r_{ftotal,n-1})}{(T_{2TC,n} - T_{2TC,n-1})} - 1$$

wherein $T_{1,n}$ is the departure time of the nth timing message sent from the master device to the slave device, $T_{2TC,n}$ is the arrival time of the nth timing message sent from the master device to the slave device at the transparent clock device and $r_{ftotal,n}$ is the cumulative residence time of the nth timing message sent from the master device to the slave device in other transparent clock devices whilst travelling between the master device and the transparent clock device,
calculating a component $\alpha_2$ of the skew in the reverse direction from slave device to master device as:

$$\alpha_2 = \frac{(T_{4,n} - T_{4,n-1}) + (r_{rtotal,n} - r_{rtotal,n-1})}{(T_{3TC,n} - T_{3TC,n-1})} - 1$$

wherein $T_{4,n}$ is the arrival time of the nth timing message sent from the slave device to the master device, $T_{3TC,n}$ is the departure time of the nth timing message sent from the slave device to the master device from the transparent clock device and $r_{rtotal,n}$ is the cumulative residence time of the nth timing message sent from the slave device to the master device in other transparent clock devices whilst travelling between the transparent clock device and the master device, and
estimating the skew as the average of $\alpha_1$ and $\alpha_2$.

14. A transparent clock device according to claim 8 wherein the processor is arranged to estimate the skew of the local clock by operating a Kalman filter using the measurement equation $$\frac{(T_{1,n} - T_{2TC,n}) + (T_{4,n} - T_{3TC,n}) + (d_f - d_r) + (r_{ftotal,n} - r_{rtotal,n})}{y_n} = \frac{2\theta_n}{D_n x_n} + \frac{(\gamma_n - \varepsilon_n)}{v_a}$$

wherein $\theta_n$ and $\alpha_n$ are the total offset and skew during the nth exchange of timing messages, $T_{1,n}$ is the departure time of the nth timing message sent from the master device to the slave device, $T_{2TC,n}$ is the arrival time of the nth timing message sent from the master device to the slave device at the transparent clock $T_{4,n}$ is the arrival time of the nth timing message sent from the slave device to the master device, $T_{3TC,n}$ is the departure time of the nth timing message sent from the slave device to the master device from the transparent clock device, $r_{ftotal,n}$ is the cumulative residence time of the nth timing message sent from the master device to the slave device in other transparent clock devices whilst travelling between the master device and the transparent clock device, $r_{rtotal,n}$ is the cumulative residence time of the nth timing message sent from the slave device to the master device in other transparent clock devices whilst travelling between the transparent clock device and the master device, $d_f$ and $d_r$ are the fixed delays in the directions from master device to slave device and slave device to master devices respectively, $y_n = (T_{1,n} - T_{2TC,n}) + (T_{4,n} - T_{3TC,n}) + (d_f - d_r) + (r_{ftotal,n} - r_{rtotal,n})$ is a scalar, n is a nonnegative time index, $D_n = [2\ 0]$ is a 1×2 matrix, $X_n^T = [\theta_n\ \alpha_n]$ is a vector, and $v_n = (\gamma_n - \varepsilon_n)$ is the measurement noise,
and using the state equation:

$$X_n = \begin{bmatrix} \theta_n \\ \alpha_n \end{bmatrix} = \begin{bmatrix} 1 & (T_{2TC,n} - T_{2TC,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = A_n X_{n-1} + w_n$$

where $w_n^T = [w_{\theta,n}\ w_{\alpha,n}]$ is a process noise vector.

15. A networked time system including a master device having a master clock and a slave device, a network connecting the master device to the slave device and an end-to-end transparent clock device located in the network between the master device and the slave device and having a local clock, wherein:
the master device and slave device are arranged to exchange timing messages over the network, the timing messages passing through said transparent clock device;
the master device is arranged to record times of sending and receiving of said timing messages at the master device;
the transparent clock device includes a local clock and a processor, and the processor is arranged to:
extract, from timing messages sent from the master device to the slave device, the times of sending and receiving of said timing messages;
record the times of receipt by the transparent clock device of timing messages sent from the master device to the slave device;
record the times of sending by the transparent clock device of timing messages sent from the slave device to the master device;
extract, from the timing messages, the residence time of the timing messages in other transparent clock devices between the master device and the transparent clock device; and
measure message residence time for the transparent clock device, modify an incoming correction field with at least the measured message residence time to generate a modified correction field, and send the modified correction field to the slave device; and
estimate the skew of the local clock in the transparent clock device compared to the master clock using a plurality of each of said extracted and recorded times.

16. A networked time system according to claim 15, wherein the processor is further arranged to syntonize the local clock in the transparent clock device to the master clock.

17. A networked time system according to claim 15, wherein the processor is further arranged to compute modified residence times in the transparent clock device using the estimated skew of the local clock.

18. A networked time system according to claim 15, wherein the master device and transparent clock device are capable of hardware timestamping arriving and outgoing timing messages, the processor is arranged to extract the residence time by:
extracting the residence time recorded in the timing messages sent from the master device to the slave device on arrival in the transparent clock device; and
extracting the residence time recorded in the timing messages sent from the slave device to the master device on departure from the transparent clock device and the total residence time recorded between the slave device and the master device.

19. A networked time system according to claim 15, wherein the master device and transparent clock device are not capable of hardware timestamping the arriving and outgoing timing messages, wherein the master device is further arranged to:
for each first timing message sent from the master device to the slave device, send a first further timing message from the master device to the slave device which contains the time of sending of the respective first timing message by the master device, and to which is cumulatively added, by each transparent clock that the further timing message passes through, a first residence time being the time taken for the respective first timing message to pass through each said transparent clock device; and
for each second timing message sent from the slave device to the master device, send a second further timing message from the master device to the slave device which contains the time of receipt of the respective second timing message by the master device, and to which is cumulatively added, by each transparent clock that the second further timing message passes through, a second residence time being the time taken for the respective second timing message to pass through each said transparent clock device,
and wherein the processor is further arranged to:
extract the first residence time recorded in one of said first further timing messages; and
extract the second residence time recorded in one of said second further timing messages on receipt of the second further timing message at the transparent clock device.

20. A networked time system according to claim 15 wherein the processor is arranged to estimate the skew of the local clock by:
calculating a component $\alpha_1$ of the skew in the forward direction from master device to slave device as:

$$\alpha_1 = \frac{(T_{1,n} - T_{1,n-1}) + (r_{ftotal,n} - r_{ftotal,n-1})}{(T_{2TC,n} - T_{2TC,n-1})} - 1$$

wherein $T_{1,n}$ is the departure time of the nth timing message sent from the master device to the slave device, $T_{2TC,n}$ is the arrival time of the nth timing message sent from the master device to the slave device at the transparent clock device and $r_{ftotal,n}$ is the cumulative residence time of the nth timing message sent from the master device to the slave device in other transparent clock devices whilst travelling between the master device and the transparent clock device, calculating a component $\alpha_2$ of the skew in the reverse direction from slave device to master device as:

$$\alpha_2 = \frac{(T_{4,n} - T_{4,n-1}) + (r_{rtotal,n} - r_{rtotal,n-1})}{(T_{3TC,n} - T_{3TC,n-1})} - 1$$

wherein $T_{4,n}$ is the arrival time of the nth timing message sent from the slave device to the master device, $T_{3TC,n}$ is the departure time of the nth timing message sent from the slave device to the master device from the transparent clock device and $r_{rtotal,n}$ is the cumulative residence time of the nth timing message sent from the slave device to the master device in other transparent clock devices whilst travelling between the transparent clock device and the master device, and estimating the skew as the average of $\alpha_1$ and $\alpha_2$.

21. A networked time system according to claim 15 wherein the processor is further arranged to estimate the skew of the local clock by operating a Kalman filter using the measurement equation $$\underbrace{(T_{1,n} - T_{2TC,n}) + (T_{4,n} - T_{3TC,n}) + (d_f - d_r) + (r_{ftotal,n} - r_{rtotal,n})}_{y_n} =$$

$$\underbrace{\frac{2\theta_n}{D_n X_n}}_{} + \underbrace{(\gamma_n - \varepsilon_n)}_{v_a}$$

wherein $\theta_n$ and $\alpha_n$ are the total offset and skew during the nth exchange of timing messages, $T_{1,n}$ is the departure time of the nth timing message sent from the master device to the slave device, $T_{2TC,n}$ is the arrival time of the nth timing message sent from the master device to the slave device at the transparent clock device $T_{4,n}$ is the arrival time of the nth timing message sent from the slave device to the master device, $T_{3TC,n}$ is the departure time of the nth timing message sent from the slave device to the master device from the transparent clock device, $r_{ftotal,n}$ is the cumulative residence time of the nth timing message sent from the master device to the slave device in other transparent clock devices whilst travelling between the master device and the transparent clock device, $r_{rtotal,n}$ is the cumulative residence time of the nth timing message sent from the slave device to the master device in other transparent clock devices whilst travelling between the transparent clock device and the master device, $d_f$ and $d_r$ are the fixed delays in the directions from master device to slave device and slave device to master devices respectively, $y_n=(T_{1,n}-T_{2TC,n})+(T_{4,n}-T_{3TC,n})+(d_f-d_r)+(r_{ftotal,n}-r_{rtotal,n})$ is a scalar, n is a nonnegative time index, $D_n=[2\ 0]$ is a 1×2 matrix, $X_n^T=[\theta_n\ \alpha_n]$ is a vector, and $v_n=(\gamma_n-\varepsilon_n)$ is the measurement noise, and using the state equation:

$$X_n = \begin{bmatrix} \theta_n \\ \alpha_n \end{bmatrix} = \begin{bmatrix} 1 & (T_{2TC,n} - T_{2TC,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} = A_n X_{n-1} + w_n$$

where $w_n^T=[w_{\theta,n}\ w_{\alpha,n}]$ is a process noise vector.

* * * * *